(12) United States Patent
Udaka

(10) Patent No.: US 6,261,478 B1
(45) Date of Patent: Jul. 17, 2001

(54) OPTICAL DEVICE AND ELECTROYTIC SOLUTION

(75) Inventor: Toru Udaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/146,961

(22) Filed: Sep. 4, 1998

(30) Foreign Application Priority Data

Sep. 8, 1997 (JP) .................................................. 9-242647

(51) Int. Cl.$^7$ ................................. G02F 1/15; G02F 1/155
(52) U.S. Cl. .................... 252/514; 252/570; 252/299.01; 359/266
(58) Field of Search ............................ 428/697; 252/570, 252/514, 299.01; 359/266

(56) References Cited

U.S. PATENT DOCUMENTS 3,961,842 * 6/1976 Jasinski ................................. 359/266

FOREIGN PATENT DOCUMENTS 0 794 453 A1   2/1990  (EP) .
0 712 025 A2   5/1996  (EP) .
WO 96/24882   8/1996  (WO) .

* cited by examiner

*Primary Examiner*—Francis J. Lorin
(74) *Attorney, Agent, or Firm*—Sonnenschein, Nath & Rosenthal

(57) ABSTRACT

A power-saving, highly-reversible optical device is provided. The transmittance through the device is well controlled within a visible ray range. The device has good spectral characteristics while shielded from light, and the electrodes in the device are prevented from being in over-potential condition. The device has a long life, and is protected from being discolored and deteriorated in cycle use. Also, an electrolytic solution to be used in the device is provided.

The optical device comprises a solution as so put between working electrodes and a counter electrode that driving control of these electrodes brings about deposition or dissolution of silver. In this, the solution is prepared by dissolving a silver salt in a solvent, to which are added a supporting salt of an alkali metal halide such as LiBr or the like, and an alkanolamine, and optionally coumarin and a mercaptoalkylimidazole.

26 Claims, 25 Drawing Sheets

SILVER DEPOSITED

SILVER DISSOLVED

SILVER DEPOSITED

SILVER DISSOLVED

SILVER DEPOSITED

SILVER DISSOLVED

OPTICAL DEVICE AND ELECTROYTIC SOLUTION

BACKGROUND OF THE INVENTION

1. Field of the Invention

The present invention relates to optical devices (for example, optical displays for numeral or letter expression or X-Y matrix expression, and optical filters for controlling light transmittance or reflectance therethrough within a visible light range (wavelength: 400 to 700 nm)), and to an electrolytic solution to be used in those devices.

2. Description of the Related Art

Electrochromic materials (hereinafter referred to as EC materials) have heretofore been being used in voltage-driving-type displays and employed, for example, in digital timepieces and the like.

Electrochromic displays (hereinafter referred to as ECD) are of a non-light-emitting type for image expression through reflected or transmitted light, and have the advantages of giving a few fatigue feelings in long-time observation and requiring relatively low driving voltage and small electric power. For example, as in Japanese Patent Application Laid-Open (JP-A) No. Sho-59-24879, known are liquid-type ECD that comprise an EC material of organic molecules of a viologen derivative capable of reversibly producing a condition of color expression and extinction.

With the development of precision optical instruments, required are fine and power-saving light modulators capable of being substituted for conventional variable ND filters. For this, ECD such as those noted above will have to be investigated as to whether or not their peripheral technology may apply to such devices.

However, using EC materials such as viologen derivatives in ECD is problematic in point of the response speed and the shieldability necessary in practical use, and it is difficult to put ECD into practical use. Further, though the light modulators are required such that the light transmittance can be controlled within a visible light range (wavelength: 400 to 700 nm), the above-described EC materials were not satisfactory with respect to their characteristics.

In place of ECD, transmission-type or reflection-type light modulators to be driven through deposition/dissolution of metal salts are noted, and electrochemical light modulators to be driven through deposition/dissolution of silver are being developed.

The response speed and the light shieldability of such electrochemical light modulators could be on a intended level, but the transparent electrode (that is, working electrode) to be the substrate of those devices is easily deteriorated so that the life of the devices is short.

In particular, ITO (indium tin oxide) electrodes are often in overpotential condition in the cycle of deposition and dissolution of silver, and are thereby damaged.

The reversibility of metal salts in conventional electrochemical light modulators is lowered in cycle use and the electrolytic solution therein is often discolored. Therefore, conventional electrochemical light modulators could not exhibit sufficient light-modulating activity. That is, in driving the devices, if the system was kept in a peroxidized state, side-reaction products such as iodine were generated due to $2I^- \rightarrow I_2 + 2e^-$, whereby the inside of the effective diameter was often stained.

SUMMARY OF THE INVENTION

The object of the invention is to provide an optical device having an electrolytic solution which does not absorb visible rays (400 to 700 nm) (accordingly, the light transmittance or reflectance can be controlled within a visible light range) and which comprises, as the electrochemical light-modulating material, a silver complex salt capable of producing nearly uniform shielding against visible rays while the device is in a condition of color expression. In the device, the electrodes are prevented from being in an overpotential condition to thereby realize the prolongation of the life of the device, the device can be driven with power-saving, and the device is prevented from being discolored and deteriorated while depressing the formation of side-reaction products. The invention also provides the electrolytic solution to be in the device.

DETAILED DESCRIPTION OF THE INVENTION

Figure 1:
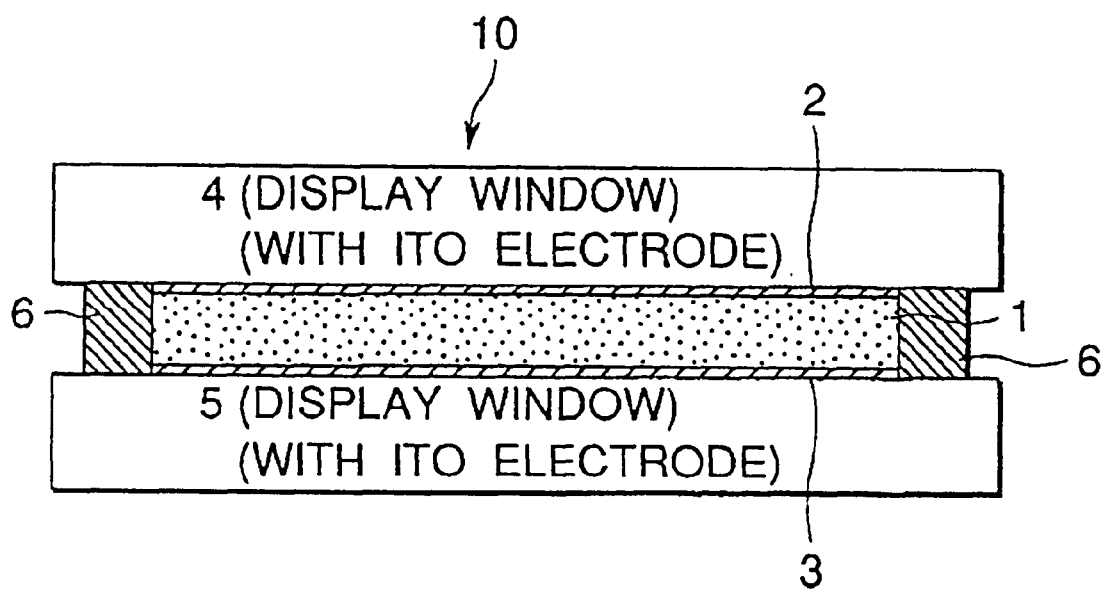
FIG. 1 is a cross-sectional view graphically showing the outline of one embodiment of the optical device of the invention.

We, the present inventors have obtained a non-aqueous reversible system of a silver complex salt capable of depositing silver from the silver complex salt on electrodes and dissolving silver on the electrodes (hereinafter this cycle will be referred to as "deposition/dissolution cycle"), and have constructed a light modulator of an electrochemical material. Using the light modulator, we have succeeded in providing a power-saving optical device capable of well controlling the light transmittance or reflectance therethrough within a visible ray range and having good reversibility and spectral characteristics, and an electrolytic solution for the device, and have completed the present invention. The electrodes in the optical device of the invention are damaged little and are well kept stable, and, in addition, the device is discolored and deteriorated little in cycle use.

Specifically, the invention provides an optical device comprising a solution of a silver salt such as a silver halide (e.g., AgF, AgCl, AgBr, AgI) silver thiocyanate (AgSCN) as so put between a working electrode and a counter electrode that driving control of these electrodes brings about deposition or dissolution of silver, wherein;

at least one salt selected from the group consisting of LiX, NaX and KX (where X represents a fluorine atom, a chlorine atom, a bromine atom or an iodine atom) as a supporting salt for dissolving (complexing) the silver salt (in particular, one being capable of supplying a halogen that is the same as or different from the halogen of the silver halide as the silver salt (the salt is hereinafter referred to as "alkali metal halide of the invention"), and an alkanolamine (in particular, at least one member selected from the group consisting of triethanolamine, diethanolamine and triethanolamine) are added to the solution.

The invention also provides an electrolytic solution for the device. It is known that, for example, triethanolamine has a molecular weight of 149.19.

Having further studied the solution noted above, we, the inventors have found that adding an alkanolamine such as triethanolamine thereto in an amount of larger than 2.5 g/L prevents the release of halogens in the solution, whereby the solution is discolored little in driving the optical device that comprises the solution. More preferably, triethanolamine is added to the solution in an amount of not smaller than 5 g/L. The composition of the solution having a triethanolamine content of 5 g/L is hereinafter referred to as "basic composition".

Even though electrolytic solutions at nearly practical level could be obtained and used in conventional optical devices, the transparent electrode (that is, the working electrode) to be the substrate of the devices is deteriorated in cycle use, as so mentioned hereinabove, and the life of the devices is short. According to the invention, however, the alkali metal halide, such as LiX and others noted above, is added to the electrolytic solution to form a complex salt of a silver halide in the solution. Therefore, as compared with quaternary ammonium salts which are used in conventional electrolytic solutions for dissolving silver salts therein, the alkali metal halide used in the invention has the advantages of retarding the overpotential for deposition and dissolution of silver and prolonging the life of electrodes.

We, the inventors added good additives to the electrolytic solution to form an electrolytic silver complex salt in the solution, and obtained a highly reversible system. The electrolytic solution that we investigated to attain the invention comprises a silver halide of silver iodide, silver bromide or silver chloride.

The silver halide must be formed into a silver complex salt in the electrolytic solution to dissolve it in the solution. As the supporting salt (this is an additive which does not directly participate in the silver deposition reaction but is necessary for dissolving silver), quaternary ammonium salts easily soluble in organic solvents have heretofore been used essentially. However, it has now been found that low-voltage driving of optical devices is important for prolonging the life of the electrodes constituting the devices. For this, desired are electrolytic solutions capable of retarding overpotential in deposition and dissolution of silver.

According to the invention, used is an alkali metal halide as the additive for retarding overpotential in dissolving the deposited silver film, whereby the electrodes (especially, ITO transparent electrode) are prevented from being deteriorated. In fact, the life test of ITO electrode which we carried out verified that the cell voltage for the electrolytic solution of the invention is lower than that for the conventional electrolytic solution (containing a quaternary ammonium salt). To effectively attain the effect, the amount of the alkali metal halide (supporting salt) to be added to the electrolytic solution is preferably from ½ to 5 times the concentration of the silver halide in the solution.

In the composition of the electrolytic solution of the invention noted above (silver halide, alkali metal halide, alkanolamine), the alkanolamine improves the reversible, electrochemical deposition and dissolution of silver while retarding the release of halogens in the solution to prevent the solution from being discolored.

That is, in driving the above-described optical device, if the system is exposed to a peroxidized state, side-reaction products such as iodine are likely formed. Since this reaction is an irreversible reaction, the inside of the effective diameter, an aspect of which is important in the optical system, is often stained. However, according to the present invention, the additive (alkanolamine) which does not cause such reaction is dissolved in the electrolytic solution and in case where side-reaction products are formed, it exerts to (reduces) the products, thereby preventing contamination of the inside of the diameter.

To advantageously attain the effect, the amount of the alkanolamine such as triethanolamine to be added to the solution is 1.0 g/L or more, preferably larger than 2.5 g/L, and more preferably not smaller than 5 g/L. An addition amount of the alkanolamine of not more than 10 g/L is practically useful from the viewpoint of keeping the performance of the electrolytic solution. The electrolytic solution (especially of the basic composition having a triethanolamine content of 5 g/L) may further contain any other additives such as coumarin and the like so as to promote the electrochemical deposition and dissolution of silver therein.

Having further studied the basic composition, we, the inventors have found that when the amount of the alkanolamine such as triethanolamine added is increased (>5 g/L), for example, to be two times that in the basic composition, while adding a mercaptoalkylimidazole represented by the following formula:

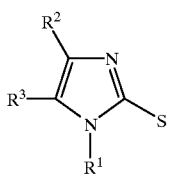

wherein $R_1$, $R_2$ and $R_3$ independently represent a hydrogen atom or an alkyl group represented by the formula: $C_nH_{2n+1}$, wherein n is an integer of 0 or more, such as mercaptomethylimidazole, to the composition, then the reversibility of the electrolytic solution is much more improved, resulting in that the solution is protected from being discolored and deteriorated even though used for a long period of time at high temperatures.

Specifically, it has been found that when, for example, triethanolamine and mercaptomethylimidazole are added to the basic composition, then the electrolytic solution is still good and transparent even after having been stored at 60° C. for 30 days. It has been further found that, even when stored at 80° C., the electrolytic solution is less discolored and deteriorated than that to which was added any other additive (for example, mercaptobenzimidazole).

As another additive for promoting the deposition of silver from silver complex salts, a cyanide solution such as that used in plating bathes is known and has heretofore been used. However, using the cyanide solution is problematic in that safe working environments for it are difficult to ensure and that the treatment of the waste from it is troublesome. Therefore, the inventors noted non-cyanide silver salts and studied them.

From electrolytic solutions of various silver complex salts, the inventors obtained a highly reversible system to which was added a reducing agent. The material used in this system is referred to as RED (Reversible Electro Deposition) material, and this is dissolved in a solvent to give an RED solution.

The RED solution (electrolytic solution) that has heretofore been studied comprises silver iodide as a silver halide, ascorbic acid as a reducing agent for improving the reversibility of the solution, and dimethylsulfoxide (DMSO) as a non-aqueous solvent. However, where solvents such as DMSO and the like that are favorable for good reversibility for silver deposition and dissolution but have bad temperature characteristics are used in the RED solution, the working environment for the devices comprising the solution is often limited. Therefore, the temperature range for the devices is broadened by using a mixed solvent in the RED solution.

In the present invention, the silver halide is subjected to redox reaction shown below while in an electric field. (Hydrogen Standard)

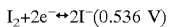

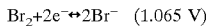

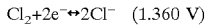

As has been mentioned hereinabove, the reversible system in which silver is deposited from its salt, silver halide on an electrode and is dissolved for color expression and extinction is used in the invention, which provides a power-saving, non-light-emitting optical device favorably used in a visible ray range. The device includes, for example, optical displays and optical filers.

In the optical device of the invention, the electrolytic solution of a silver halide as dissolved in a solvent may be so filled between the working electrode and the counter electrode, at least one of which is the electrode for silver deposition and dissolution, that it is kept in contact with these electrodes.

It is desirable that the silver salt such as silver halides is dissolved in water or in a non-aqueous solvent to form the electrolytic solution, which is in the device for attaining color expression and extinction through silver deposition and dissolution in the solution. More desirably, the electrolytic solution is a non-aqueous one.

In that embodiment, preferably used is an RED solution having a silver bromide concentration of from 0.03 to 2.0 mols/L, more preferably from 0.05 to 2.0 mols/L.

For electrochemical silver deposition and dissolution, at least one additive selected from brightening agents, complexing agents and reducing agents is preferably added to the solution.

For example, at least one selected from the group consisting of thiourea, 1-allyl-2-thiourea, mercaptobenzimidazole, phthalic acid, succinic acid, salicylic acid, glycolic acid, dimethylaminoborane (DMAB), trimethylaminoborane (TMAB), tartaric acid, oxalic acid and D-glucono-1,5-lactone may be used as the additive.

In the RED solution for use in the invention, the silver salt to be dissolved is preferably combined with a reducing to give a system with higher reversibility. Conventional RED solutions that have heretofore been studied in the art comprise ascorbic acid as the reducing agent and a non-aqueous solvent of dimethylsulfoxide (DMSO) only. However, since DMSO therein has a solidifying point of 18° C., the conventional RED solutions of that type are problematic in point of their low-temperature characteristics. For example, when used in a cold district, the solutions are often frozen. Therefore, the solvent usable in RED solutions shall be naturally limited.

Given that situation, the inventors tried non-aqueous solvents having a low solidifying point and usable in the reversible system comprising a silver complex salt for silver deposition and dissolution on and from transparent electrodes, even at low temperatures without worsening the low-temperature characteristics of the system, while investigating reducing agents applicable to the system.

Our studies have revealed that all the above-mentioned reducing agents such as DMAB, TMAB and others are satisfactorily usable in the reversible system along with the solvents which have a low solidifying point but which have not been studied at all in the art, for the purpose of improving the low-temperature characteristics of the reversible system, and that the reducing agents are more easily soluble in the solvents than in ascorbic acid noted above. The electrolytic solution of this type comprising the solvent having a low solidifying point solidifies at a temperature lower than that at which the conventional electrolytic solution comprising DMSO, and therefore does not freeze even when used in a cold district. In this embodiment, it is desirable that the concentration of the reducing agent is from 1/150 to 1 time that of the silver salt.

As the solvent having a low solidifying point, preferred is at least one solvent (non-aqueous solvent) selected from the group consisting of dimethylformamide (DMF), diethylformamide (DEF), N,N-dimethylacetamide (DMAA), N-methylpropionic acid amide (MPA), N-methylpyrrolidone (MP), propylene carbonate (PC), acetonitrile (AN), 2-methoxyethanol (MEOH), and also 2-ethoxyethanol (EEOH), dimethylsulfoxide (DMSO), dioxolane (DOL), ethyl acetate (EA), tetrahydrofuran (THF), methyltetrahydrofuran (MeTHF), dimethoxyethane (DME) and γ-butyrolactone (GBL).

Of the non-aqueous solvents, preferred are those having a lower solidifying point than DMSO (especially, the solidifying point of DMF, DEF, MEOH and EEOH is lower than that of DMSO by 70° C. or more). The RED solution comprising a silver halide as dissolved in such a low-solidifying-point emsolvent has better low-temperature characteristics and are well usable even in a cold district. If DMSO is mixed with acetonitrile or the like to give a mixed solvent (for example, 1/1 by volume), the mixed solvent is usable even at low temperatures. In that manner, therefore, solvents which have good reversibility for silver deposition and dissolution but have bad temperature characteristics can be used, and the latitude for usable solvents is enlarged. Since the electrolytic solution of the invention does not freeze at low temperatures, it is well usable even in a cold district.

The transparent electrode of the working electrode for silver deposition and dissolution (transparent electrodes having a light transmittance of 70% or more within a visible light range, especially, ITO electrode as produced by doping indium oxide with tin) may be chemically or physically modified. The modified transparent electrode is preferred, since the silver deposition potential for it may be lowered, and silver deposition and dissolution on and from it is easy. In this preferred embodiment, the electric damage to the transparent electrode and the electrolytic solution is reduced.

For its chemical modification, the ITO electrode is preferably surface-treated (chemically plated) with palladium or the like in a two-liquid process using a tin solution and a palladium solution. In this, the surface of the ITO electrode is activated by palladium, for which palladium nuclei are deposited on the surface of an ITO substrate. In that manner, the activity of the surface of the thus-modified ITO electrode is increased.

The tin solution usable in this embodiment may be prepared by dissolving from 0.10 to 1.0 g of tin chloride ($SnCl_2$) in one liter of 0.010 to 0.10% HCl; and the palladium solution may be prepared by dissolving from 0.10 to 1.0 g of palladium chloride ($PdCl_2$) in one liter of 0.010 to 0.10% HCl.

For the physical modification, a metal that is more cathodic than silver or the like may be deposited on the ITO electrode through vapor deposition.

It is desirable that the electrolytic solution of the invention does not absorb visible rays while the optical device comprising the solution is in color extinction condition, and that the substrate electrode for color expression and extinction (that is, the working electrode) in the device is an ITO electrode not absorbing visible rays in order to favorably drive the device.

In cycle use of the device for color expression and extinction, the RED solution system could not be stirred, Lin since the device is very small. Therefore, it is desirable that the device is driven through current control capable of facilitating the quantitation of electrochemical silver deposition and dissolution.

In the driving method for color expression-extinction cycle to be attained by current control, preferred is a varying current that has a rectangular profile varying from a high current value to a low current value. In the driving method using the current of that type, the color expression-extinction speed (silver deposition and dissolution speed) may be high. Alternatively, a varying current that has a rectangular profile varying from a low value to a high value may also be employed in the driving method. Apart from those, a constant current is also employable. In the constant-current driving method, however, it is desirable that the current is controlled with a limiter or the like at the potential at which side products will be formed (this is for keeping the electrolyte balance in the system).

The present invention is broadly applicable to various optical devices that include, for example, displays for numeral or letter expression or for X-Y matrix expression, and optical filters for light transmittance or reflection control within a visible ray range (wavelength: 400 to 700 nm).

The invention also provides the electrolytic solution for those optical devices, which comprises a silver halide and a supporting salt such as those noted above as dissolved in a solvent.

The electrolytic solution comprises a silver salt such as a silver halide as dissolved in water or in a non-aqueous solvent to have a silver salt concentration of preferably from 0.03 to 2.0 mols/L, and produces color expression and extinction through silver deposition and dissolution therein. To this are added a supporting salt and other additives such as those noted above. Optionally, this may contain predetermined amounts of brightening agents, complexing agents, reducing agents and other solvents.

Preferred embodiments of the invention are described below.

Figure 2:
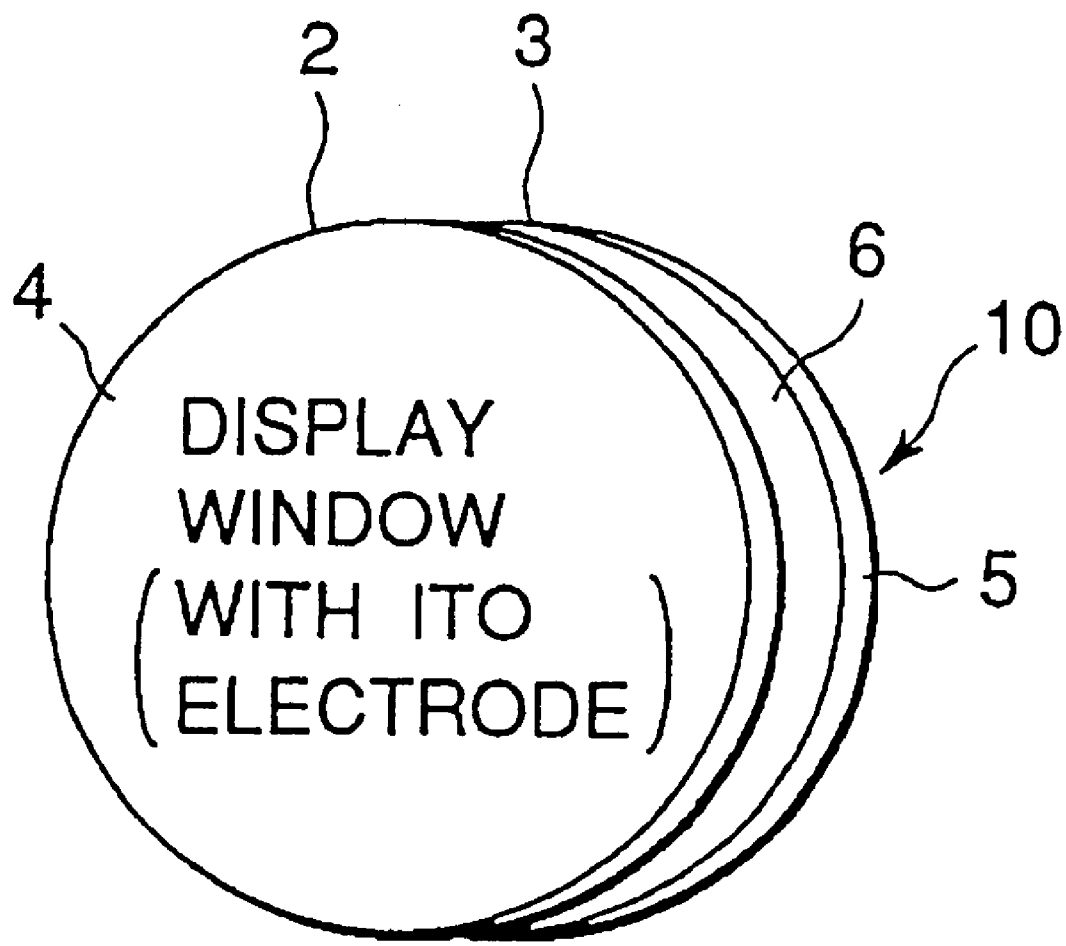
FIG. 2 is a perspective view graphically showing the outline of the embodiment of the optical device of FIG. 1.

FIG. 1 and FIG. 2 show one embodiment of the optical device 10 of the invention for an optical display (or optical filter).

The optical device 10 illustrated comprises a pair of transparent substrates (e.g., glass substrates) 4 and 5 as spaced by a predetermined distance to be display windows constructing a cell; working electrodes (e.g., ITO electrodes) 2 and 3 formed on the inner surface of each substrate, at least one of which is a color expression electrode or a color extinction electrode; and a counter electrode 6, the electrodes being sandwiched between the substrates to face each other. In practical devices, those working electrodes are patterned in accordance with the object of the devices. In the drawings herein, however, the outline of the electrodes is graphically shown.

The counter electrode 6 is provided throughout the entire circumferences of the substrates 4 and 5, and acts also as the spacer. For this, for example, used is a silver strip. Though not shown, a silver wire shall be provided as the reference electrode.

Between the facing working electrodes 2 and 3 and the counter electrode 6, filled is an RED solution 1 which is prepared by dissolving RED materials of a silver halide (complex salt), an alkali metal halide, coumarin, triethanolamine, mercaptomethylimidazole and others in a non-aqueous solvent. The RED solution 1 is kept in contact with those electrodes in a sealed condition. One of the facing working electrodes 2 and 3 and the counter electrode 6 is an anode while the other is a cathode. A direct-current driving voltage is applied to those electrodes for a predetermined period of time to induce the redox reaction mentioned below for the silver (complex) salt on the cathode.

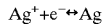

As a result of the Ag deposition on the cathode, the device that is originally transparent is converted into a colored one.

Through the display window provided with the working electrode on which was formed the Ag precipitate, observed is a specific color of the Ag precipitate (for example, reflected color), and the device thus acts as a filter. The filter effect of the color expression that depends on the visible ray transmittance or reflectance through the filter (or the light and shade of the color of the filter) varies depending on the voltage applied to the filter and on the time for the voltage application. Controlling the voltage and the time makes the device function as a transmittance or reflectance-variable display or filter.

The optical device 10 may have the working electrodes 2 and 3 on the entire inner surfaces of the cell. In fact, however, the constitution of the cell may be, for example, as in FIG. 3 and FIG. 4.

Figure 3:
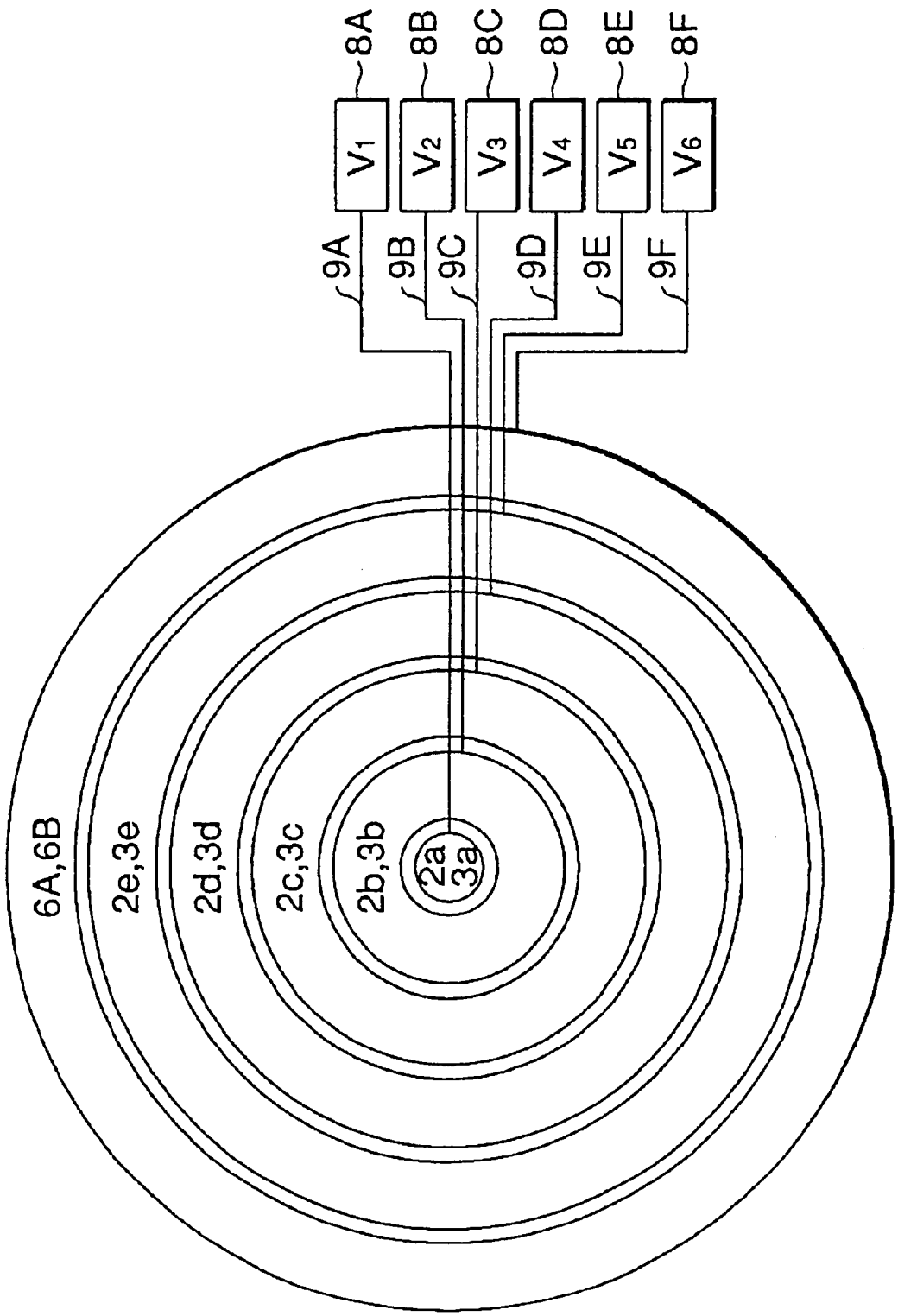
FIG. 3 is a graphic view showing the ITO electrode pattern for another embodiment of the optical device of the invention.
Figure 4:
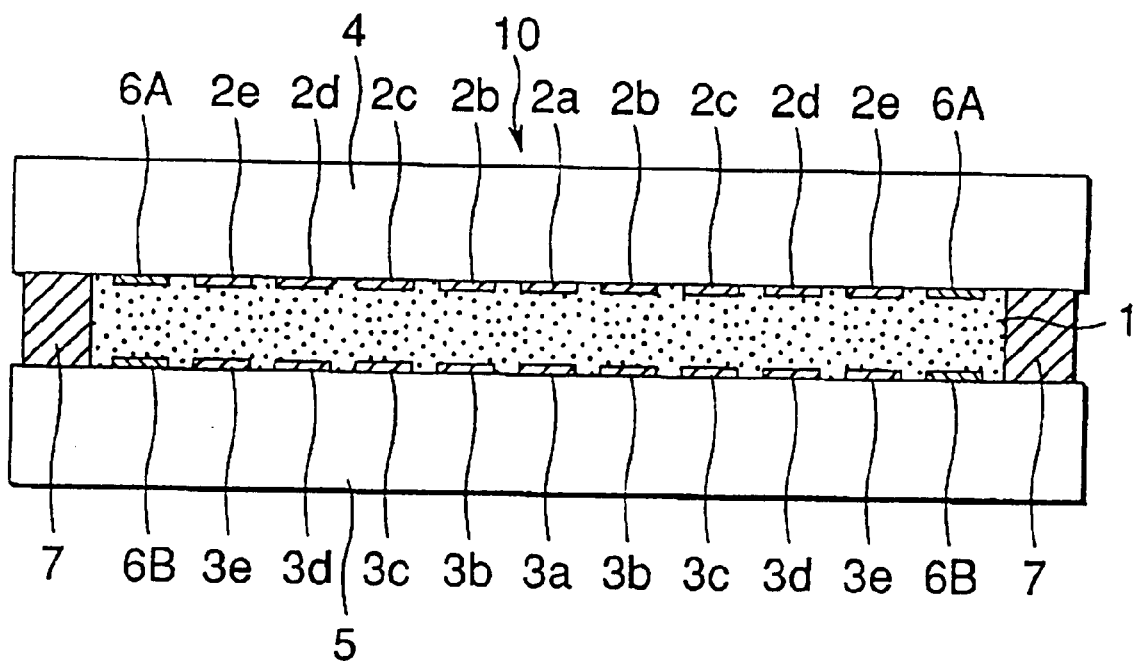
FIG. 4 is a cross-sectional view graphically showing the outline of the embodiment of the optical device of FIG. 3.

In FIG. 3 and FIG. 4, the working electrodes of ITO as formed on the inner surfaces of the transparent electrodes 4 and 5 are in small portions of the center electrodes 2$a$ and 2$b$ and the concentric ring electrodes 2$b$, 3$b$, 2$c$, 3$c$, 2$d$, 3$d$, 2$e$ and 3$e$ as formed around the center electrodes with being spaced to have a minor distance between the adjacent ones. Around the outermost working electrodes 2$e$ and 3$e$, formed is counter electrodes 6A and 6B of silver.

These electrodes 2$a$, 3$a$, 2$b$, 3$b$, 2$c$, 3$c$, 2$d$, 3$d$, 2$e$, 3$d$, 6A and 6B are connected with driving power sources 8A, 8B, 8C, 8D, 8E and 8F, via fine wires of chromium 9A, 9B, 9C, 9D, 9E and 9F, respectively.

The transparent electrodes 4 and 5 are spaced by the spacer 7 (in FIG. 4, the counter electrode 6 acts also as the spacer) to have a predetermined distance therebetween, and the RED solution 1 is filled and sealed in the distance.

The RED solution 1 is controlled for the redox reaction (that is, the density) depending on the voltage applied thereto. Therefore, by varying the voltage to be applied between the electrode portions, 2$a$ and 3$a$, 2$b$ and 3$b$, 2$c$ and 3$c$, 2$d$ and 3$d$, 2$e$ and 3$e$, and the electrodes 6A and 6B (referred to as $V_1$, $V_2$, $V_3$, $V_4$ and $V_5$, respectively), the amount of the silver precipitate to be deposited from the RED solution on each cathode portion may be varied (to the counter electrodes 6A and 6B, applied is a voltage $V_6$ for potential compensation).

If the same voltage is applied to all these electrodes ($V_1=V_2=V_3=V_4=V_5$), the RED solution 1 is entirely colored in the same color, and the density of the color may be varied uniformly depending on the voltage applied.

If different voltages are applied to these electrodes, for example, in the manner of $V_1<V_2<V_3<V_4<V_5$, the color density increases from the center to the peripheral area (in other words, the transmittance decreased in that order). This embodiment is useful as optical stops and the like for CCD (charge coupling devices) in TV cameras, etc., and is effective for increasing the integration of CCD. If the voltages to be applied to the electrodes are in a different order that is opposite to the above, the transmittance through the cell increases from the center to the peripheral area.

As in the above, the light and shade and even the gradation to be seen through the cell can be controlled in various patterns by varying the voltage to each electrode portion. The optical filter of this embodiment has many applications in a broad range.

As has been mentioned hereinabove, the embodiment illustrated is based on a technical idea that is quite different from that using conventional EC materials. In the embodiment, used is a filter material of RED that comprises silver bromide for light modulation in optical instruments, and the color density of the RED material is varied by controlling the driving condition for the working electrode and the counter electrode (especially, by varying the voltage to be applied to those electrodes). Owing to this characteristic, the invention has realized optical displays and optical filters with color gradation. As being characterized by the use of the RED material, the invention thus provides a fine and power-saving, light-modulating device, and the capabilities of the filter comprising the device are better than those of conventional variable ND filters that are driven mechanically.

Now, the invention is described in more detail with reference to the following Examples, in which is used the optical device having the constitution illustrated in FIG. 1 and FIG. 2.

EXAMPLE 1

Optimization of Additives
<Effect of triethanolamine (TEA) added>

500 mmols/L of a silver salt, AgBr and 750 mmols/L of an alkali metal halide, NaI were dissolved in dimethylsulfoxide (DMSO) to prepare a reference electrolytic solution. This was sealed in a cell.

Figure 5:
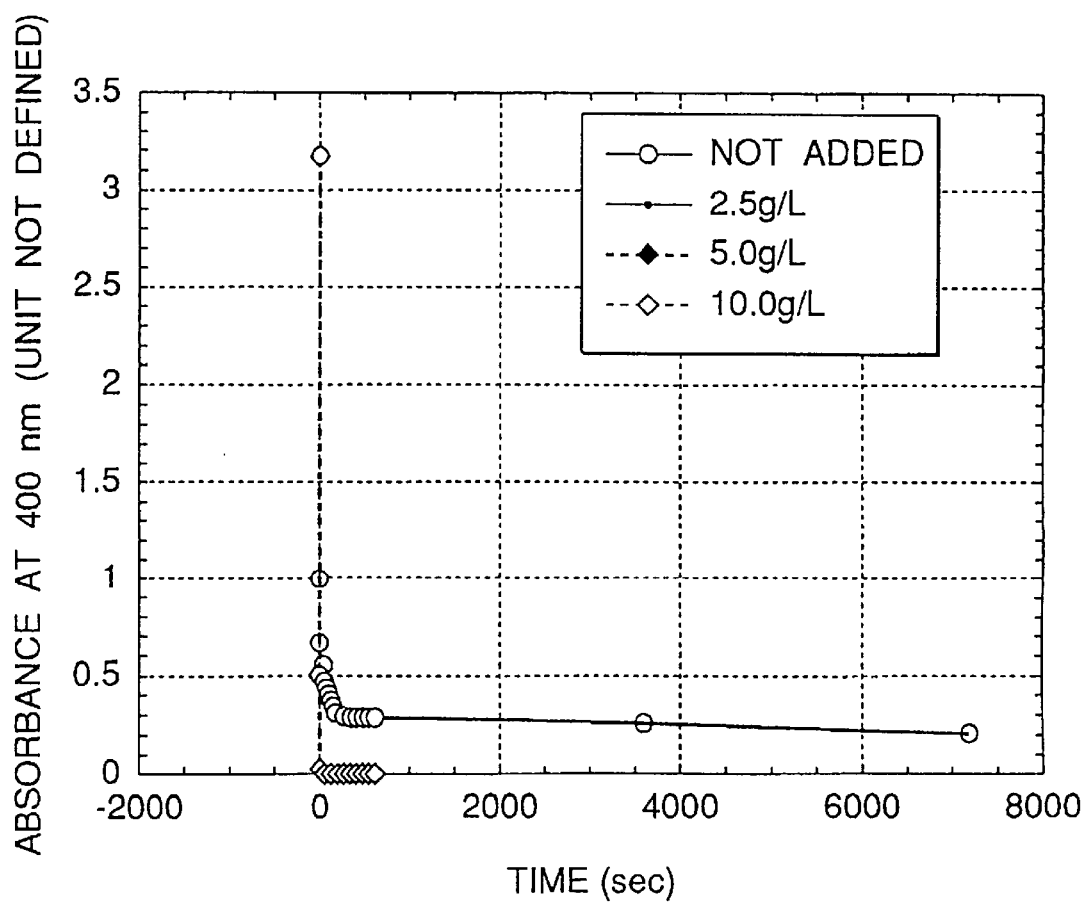
FIG. 5 is a graph indicating the effect of triethanolamine (TEA) added to electrolytic solutions for optical devices.
Figure 6:
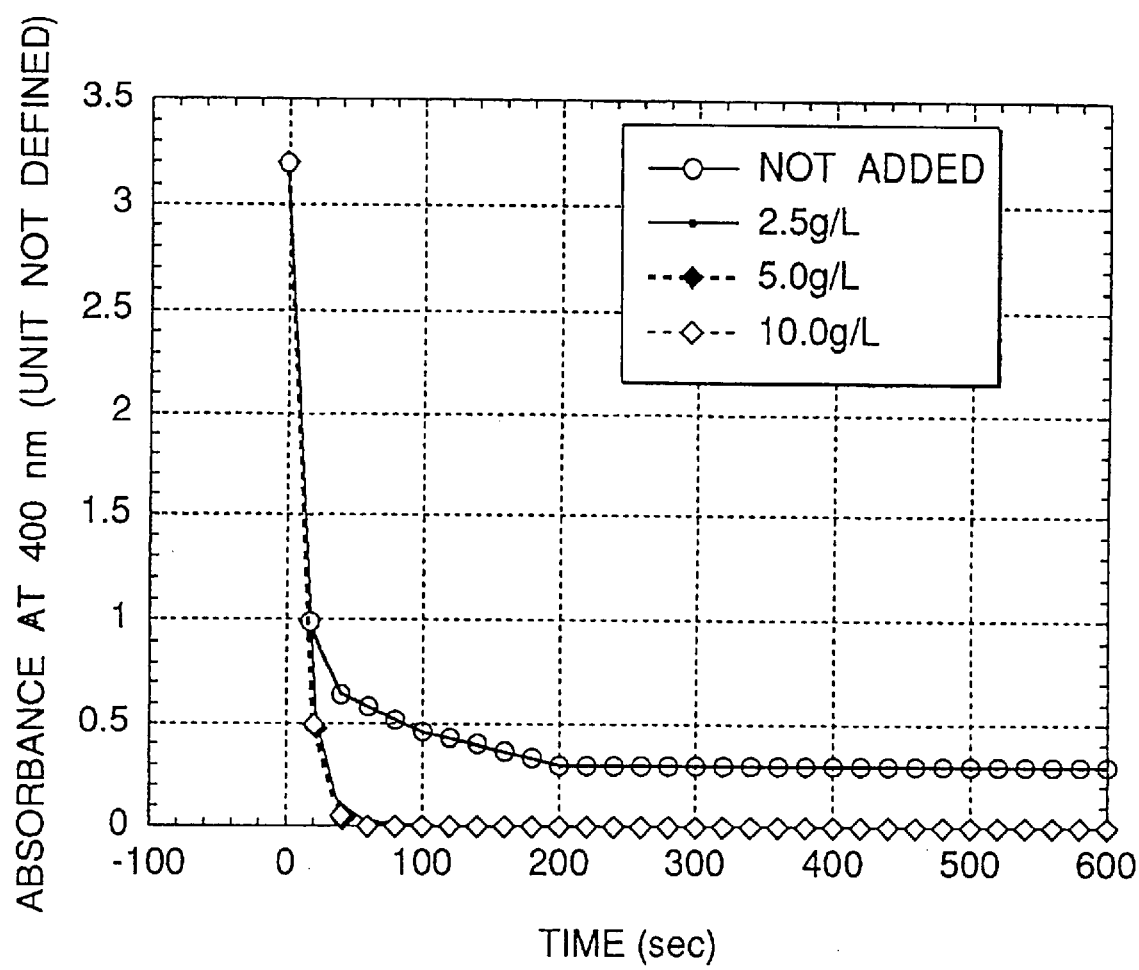
FIG. 6 is a graph corresponding to that of FIG. 1 but drawn in a different scale, indicating the effect of triethanolamine (TEA) added to electrolytic solutions for optical devices.
Figure 7:
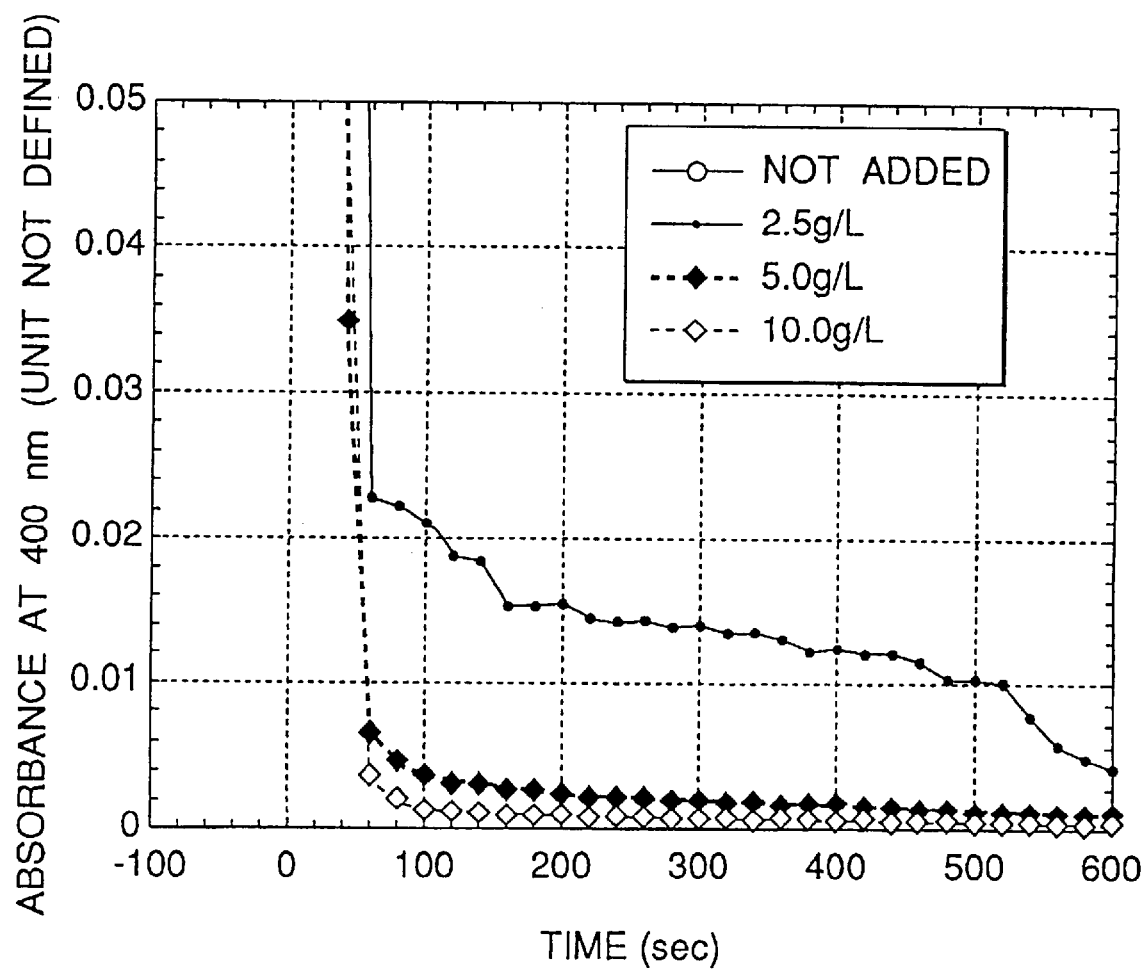
FIG. 7 is a graph corresponding to that of FIG. 1 but drawn in a different scale, indicating the effect of triethanolamine (TEA) added to electrolytic solutions for optical devices.

A varying amount of TEA was added to this reference electrolytic solution. The time-dependent absorbance at 400 nm of each of the reference electrolytic solution to which TEA was not added and the TEA-added solutions was varied under a potential condition under which the silver halide is easily oxidize at predetermined intervals. The data obtained are plotted in the graphs of FIG. 5, FIG. 6 and FIG. 7. In those graphs, the scales of the vertical axis and the horizontal axis are varied, but all those graphs indicate the same data relative to the varying amount of TEA added.

From the data plotted, it is known that the absorbance of the electrolytic solutions to which TEA was added decreases, as compared with the solution to which TEA was not added, or that is, the TEA-added solutions are significantly protected from being discolored (yellowed). Precisely, it is known that the decrease in the absorbance of the TEA-added solutions increases with the increase in the amount of TEA added, from larger than 2.5 g/L to 5.0 g/L and even to 10 g/L. In particular, it is known that the discoloration of the TEA-added solutions is greatly reduced when the amount of TEA added is 5.0 g/L or more. It is believed that TEA added to the solutions effectively retards the release of halogens (that is, the discoloration of the solutions) that may occur easily in the oxidation condition.
<Optimization of additives: Test for discoloration and deterioration of electrolytic solutions at high temperatures>

A basic composition comprised of 500 mmols/L of a silver salt, AgBr, 750 mmols/L of an alkali metal halide, NaI, and, as additives, 1 g/L of coumarin and 5 g/L of triethanolamine was prepared. This was dissolved in DMSO to prepare a standard electrolytic solution.

To the standard electrolytic solution, further added were the following additives, MEBI, MEMI and TEA in the manner mentioned below to prepare the following electrolytic solutions 1, 2, 3 and 4.

Basic Composition:

| | |
|---|---|
| AgBr | 500 mmols/L |
| NaI | 750 mmols/L |
| Coumarin | 1 g/L |
| Triethanolamine | 5 g/L |
| MEBI: Mercaptobenzimidazole | 1 g/L |
| MEMI: Mercaptomethylimidazole | 1 g/L |
| TEA: Triethanolamine | 5 g/L |

The structural formulae of these additives are as follows:
MEBI (Mercaptobenzimidazole):

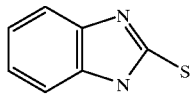

MEMI (Mercaptomethylimidazole):

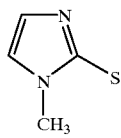

TEA (Triethanolamine):

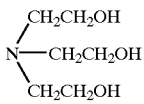

Coumarin:

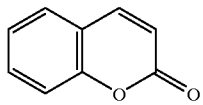

Electrolytic solution 1: Basic+MEMI (1 g/L)
Electrolytic solution 2: Basic+MEMI (1 g/L)+TEA (5 g/L)
Electrolytic solution 3: Basic+MEBI (1 g/L)
Electrolytic solution 4: Basic+MEBI (1 g/L)+TEA (5 g/L)

Figure 8:
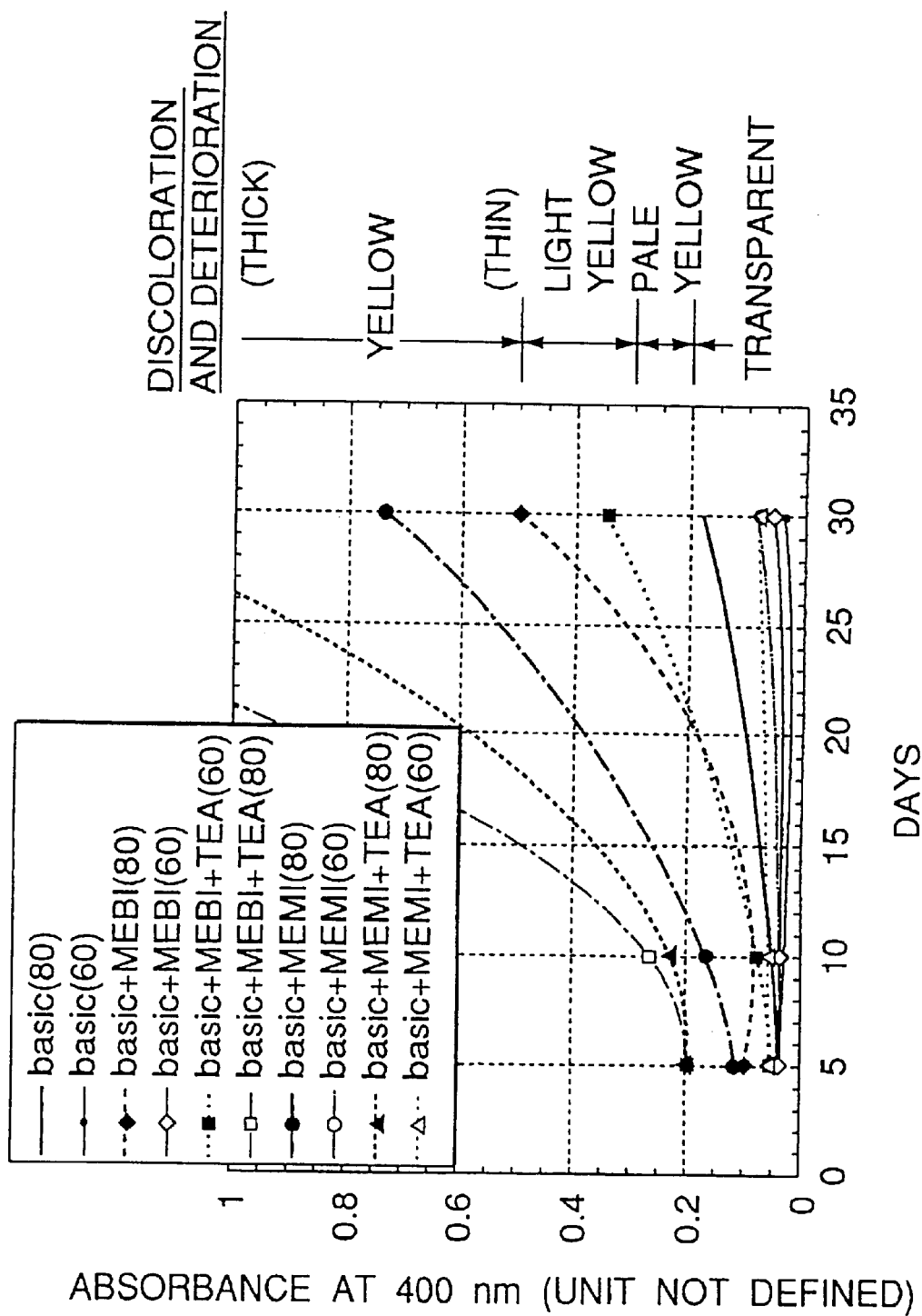
FIG. 8 is a graph indicating the light absorption characteristic (for discoloration and deterioration) of electrolytic solutions for optical devices, to which were added different additives.
Figure 9:
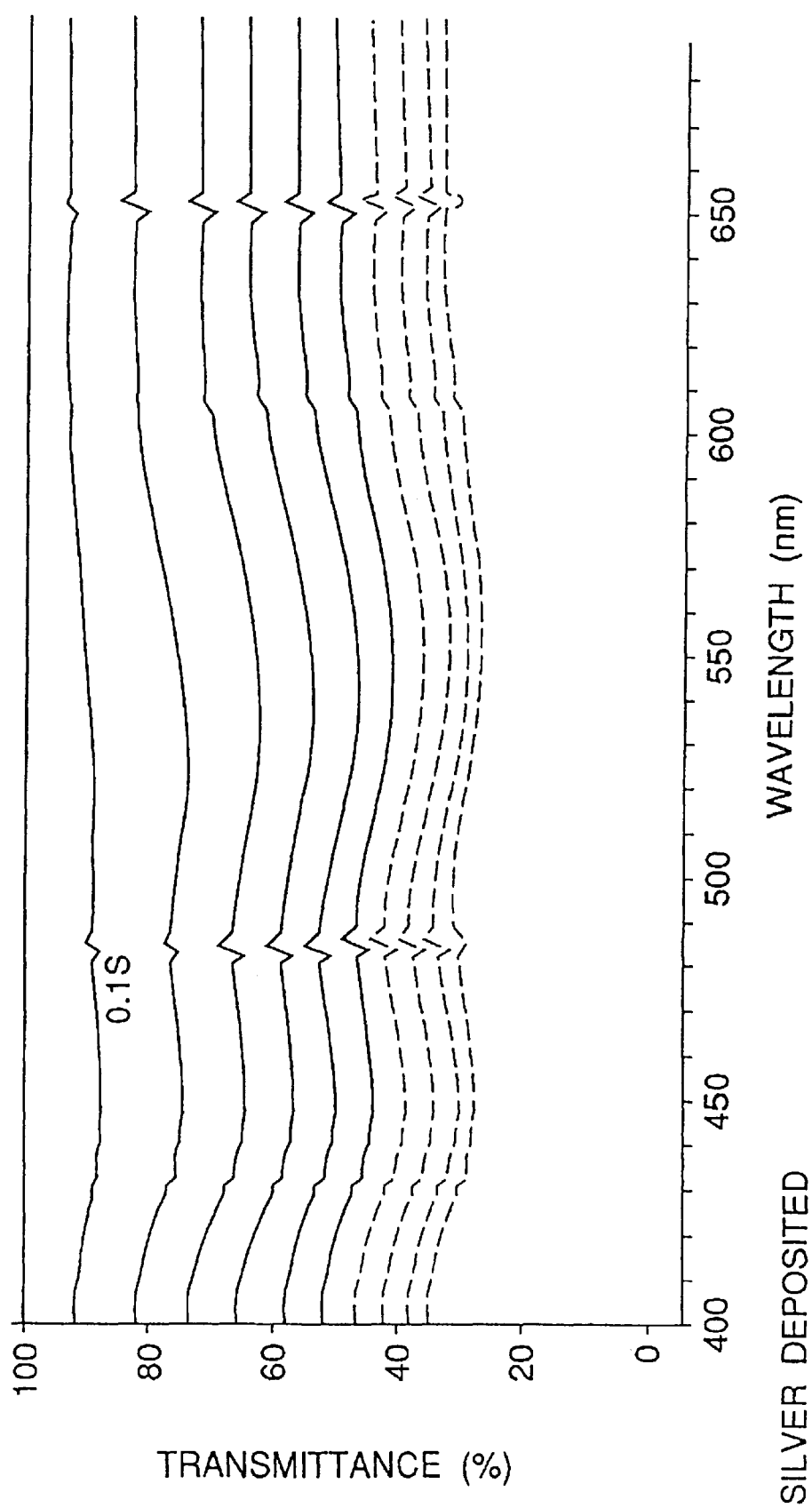
FIG. 9 is a spectral pattern indicating the variation in the transmittance, relative to the voltage applied, of an optical device, which is in color expression condition.
Figure 10:
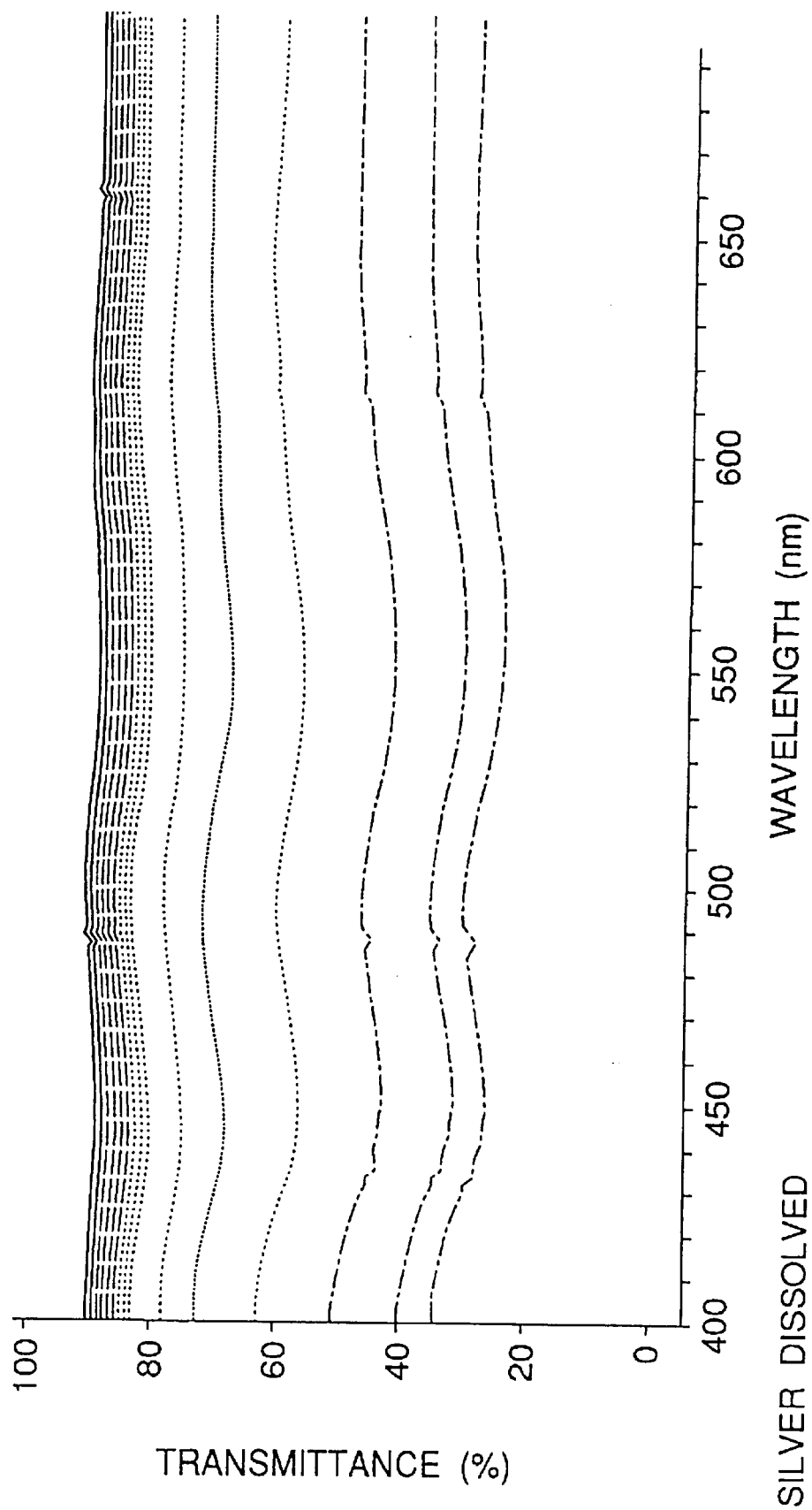
FIG. 10 is a spectral pattern indicating the variation in the transmittance, relative to the voltage applied, of the optical device for FIG. 9, which is in color extinction condition.
Figure 11:
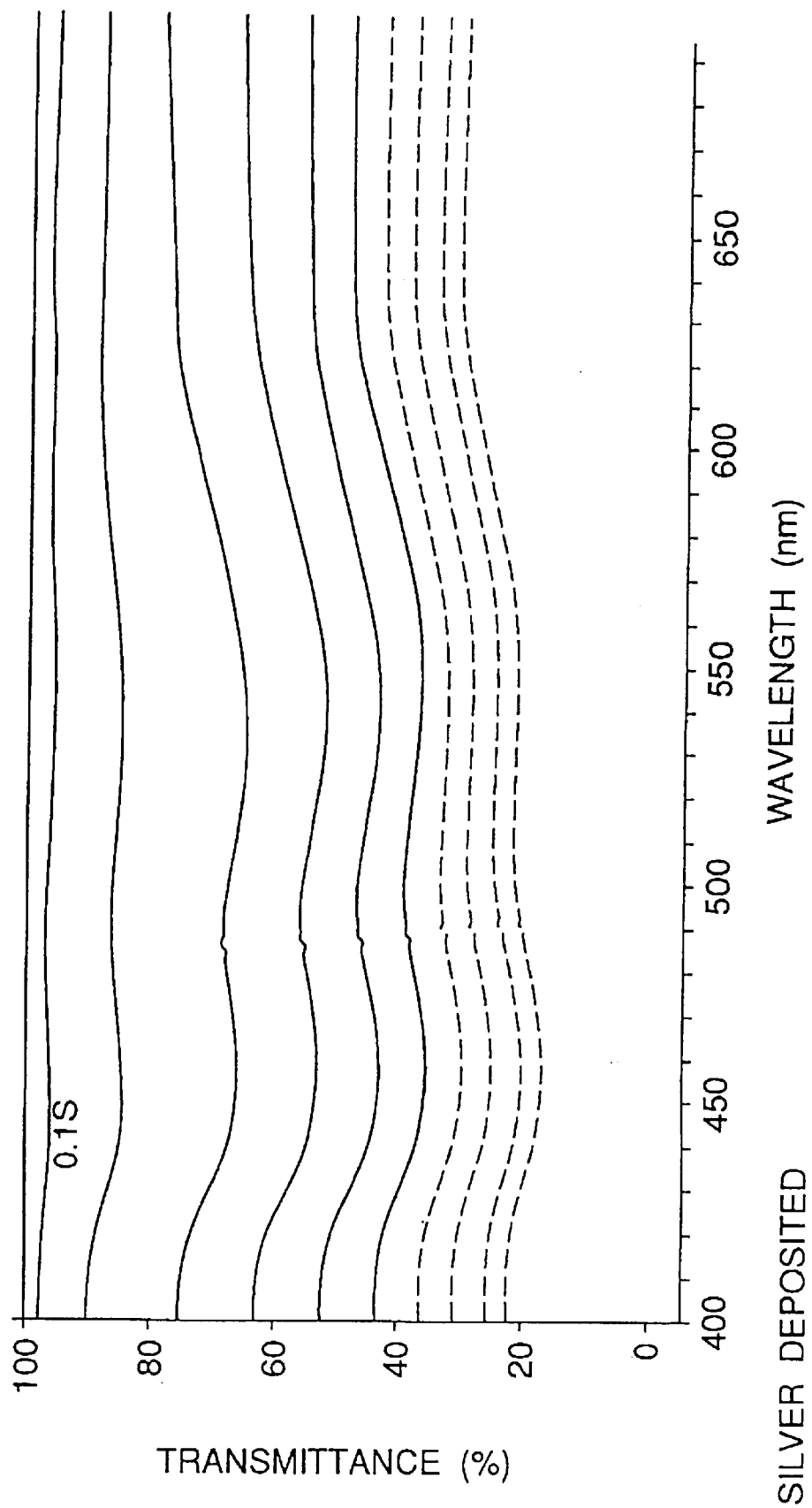
FIG. 11 is a spectral pattern indicating the variation in the transmittance, relative to the voltage applied, of another optical device, which is in color expression condition.
Figure 12:
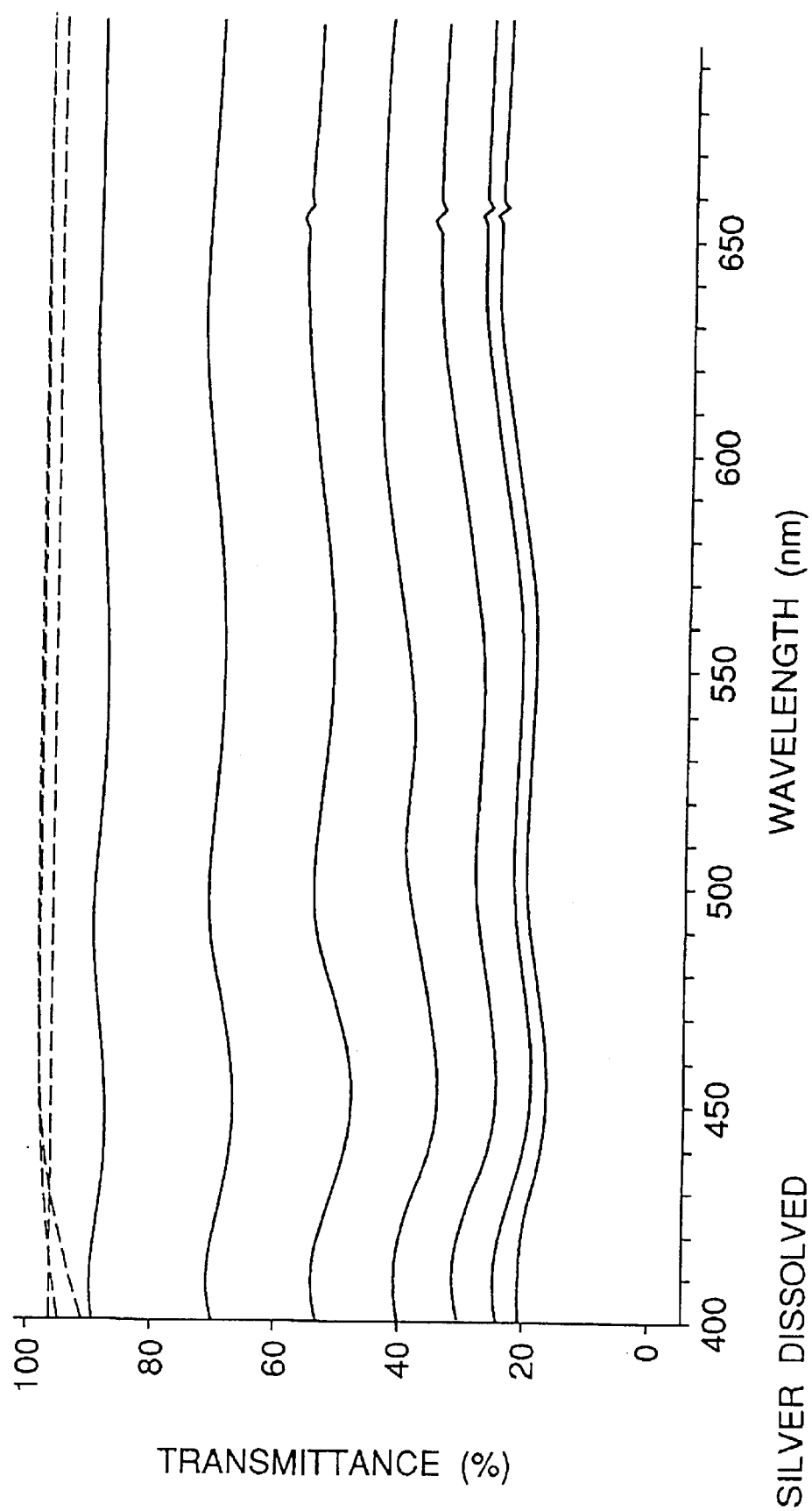
FIG. 12 is a spectral pattern indicating the variation in the transmittance, relative to the voltage applied, of the optical device for FIG. 11, which is in color extinction condition.
Figure 13:
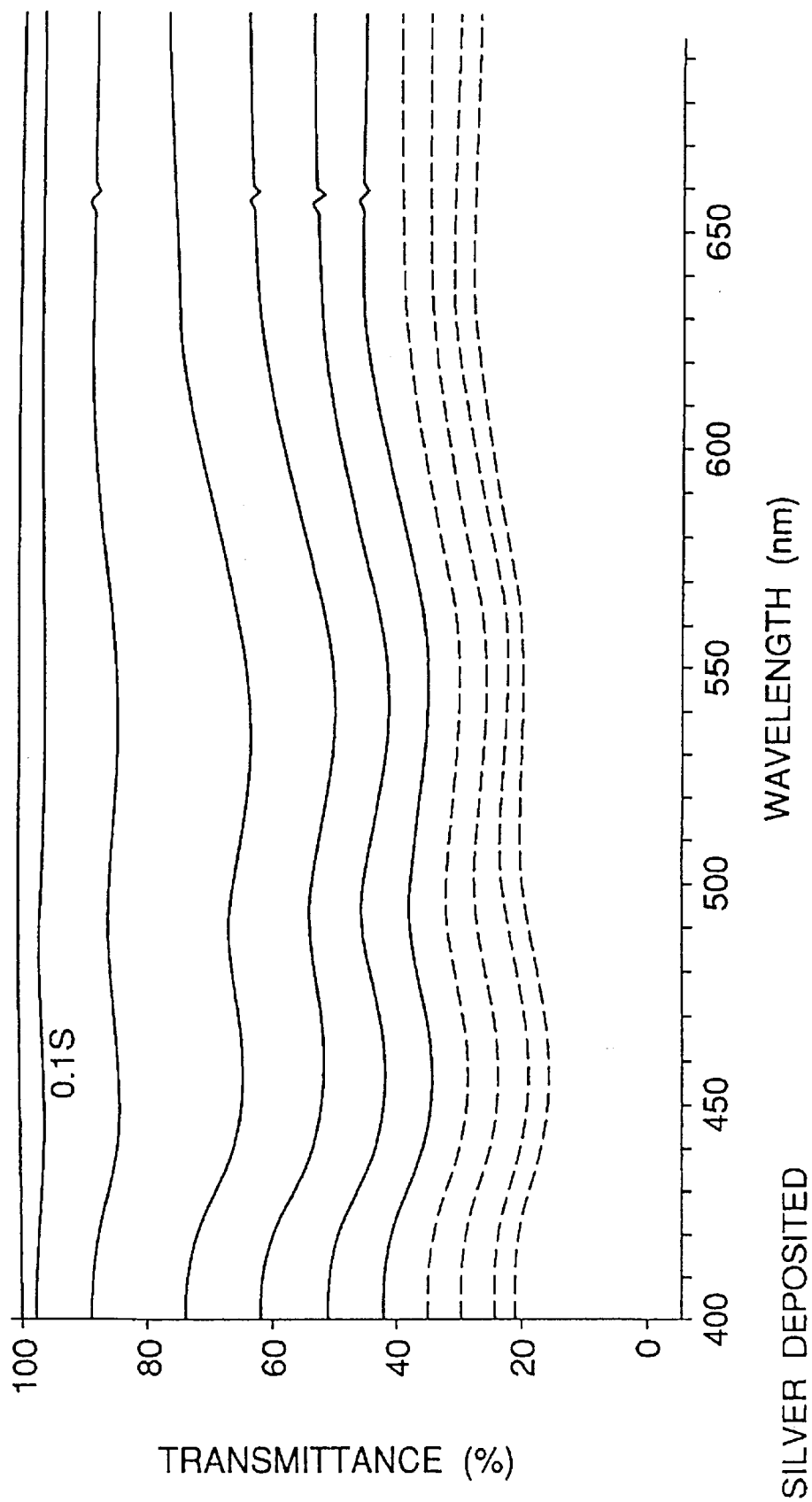
FIG. 13 is a spectral pattern indicating the variation in the transmittance, relative to the voltage applied, of still another optical device, which is in color expression condition.
Figure 14:
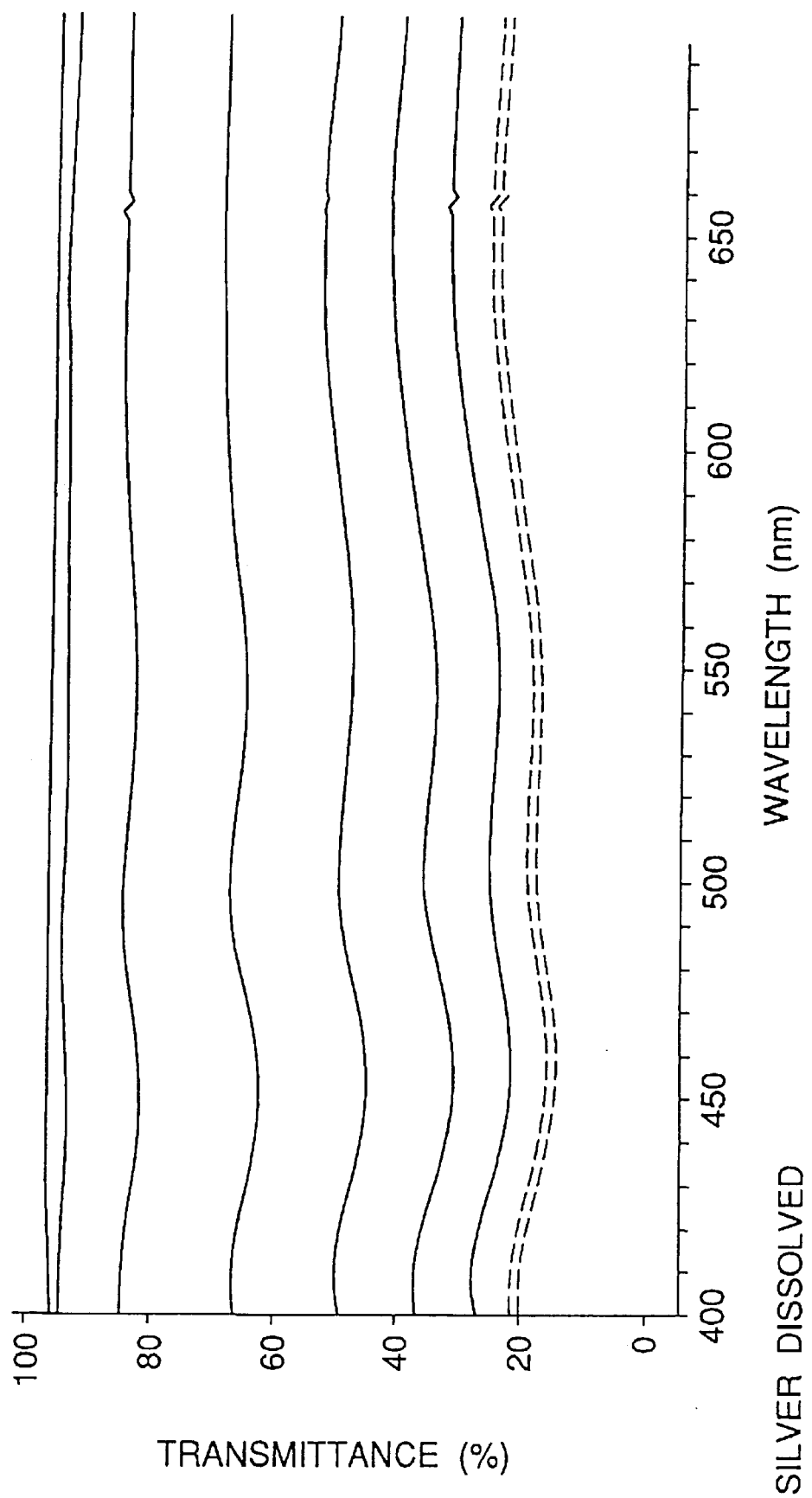
FIG. 14 is a spectral pattern indicating the variation in the transmittance, relative to the voltage applied, of the optical device for FIG. 13, which is in color extinction condition.
Figure 15:
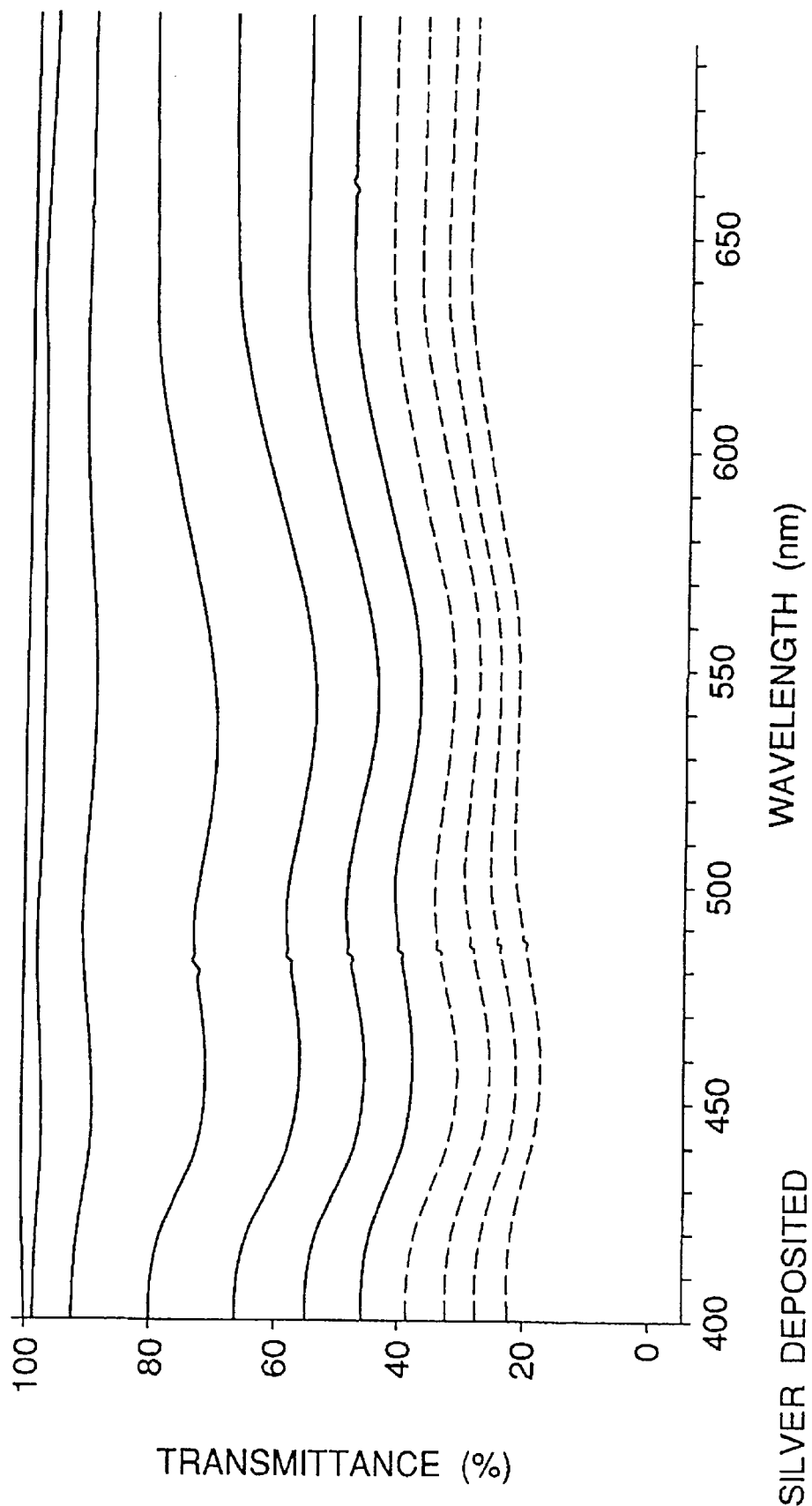
FIG. 15 is a spectral pattern indicating the variation in the transmittance, relative to the voltage applied, of still another optical device, which is in color expression condition.
Figure 16:
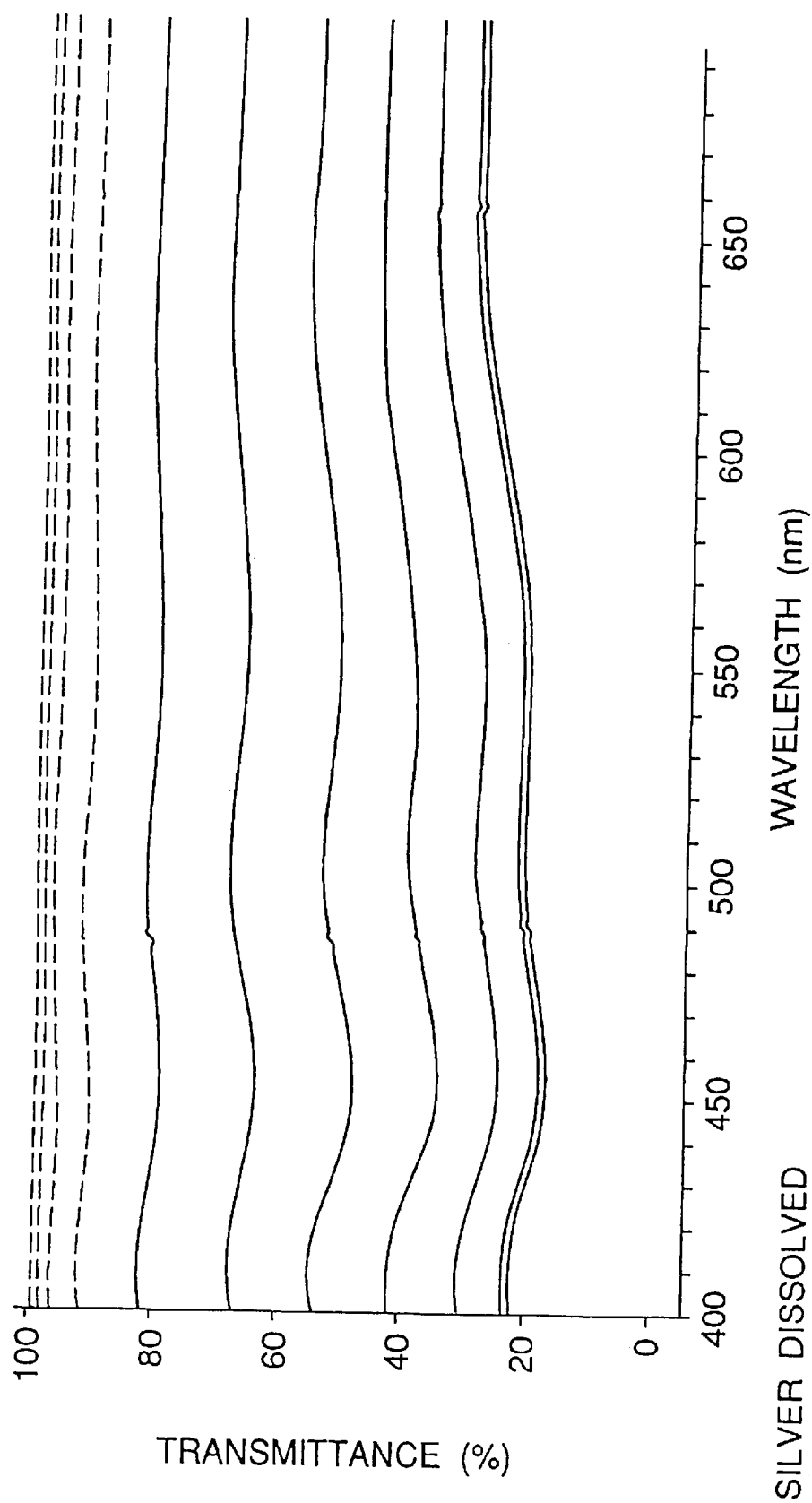
FIG. 16 is a spectral pattern indicating the variation in the transmittance, relative to the voltage applied, of the optical device for FIG. 15, which is in color extinction condition.

These electrolytic solutions were stored at high temperatures of 60° C. and 80° C., while being checked for the discoloration and deterioration, if any, at predetermined intervals. The data obtained are plotted in the graph of FIG. 8 (in which the numerals in the parentheses indicate the temperature for the storage).

The test results indicate the following:

(1) Based on the absorbance of the basic composition, the MEMI-added solutions of basic+MEMI (60) and basic+MEMI+TEA (60) (TEA content: 10 g/L) gave good results comparable to the results of the basic composition, or that is, they were still transparent after having been stored for 30 days at the high temperature. Basic+MEBI (60) also gave the same good results, in which, however, the amount of TEA was 5 g/L. Therefore, it was inferior to basic+MEBI+TEA (60) (TEA content: 10 g/L), with respect to the ability to inhibit the discoloration to be caused by free halogens in actual use and to the reversibility during the redox reaction of the silver halide. (The same tendency also applies to the MEMI-added basic composition.)

(2) The ability of the basic composition to prevent it from being discolored by free halogens and the reversibility thereof are improved by adding TEA thereto, as so mentioned in the above. Accordingly, the basic+MEMI+TEA (60) of the invention both satisfies the reversibility and the discoloration resistance in actual use and the discoloration resistance (or retardancy) at high temperatures.

(3) Regarding the temperature for storage, the discoloration resistance of the electrolytic solutions stored at 60° C. was much better than that at 80° C. This is obvious when basic+MEMI+TEA (60) is compared with basic+MEMI+TEA (80). It is believed that the reason for this will be because DMSO (solvent) in the solutions is decomposed at the higher temperature to promote the discoloration of the solutions. However, the temperature for safe storage may vary, depending on the additives added to the solutions. When stored at 80° C., the discoloration resistance of basic+MEMI+TEA (80) of the invention was higher than that of basic+MEBI+TEA (80).

EXAMPLE 2

Variation in Transmittance in Silver Deposition/ Dissolution Cycle in Constant-Potential Method Various electrolytic solutions (solvent: DMSO) comprising a silver halide, AgBr, and a supporting electrolyte (supporting salt), NaI were prepared, and compared with each other for the polarization in constant-current driving. The data obtained are shown in FIG. 9 to FIG. 18. ITO electrodes having a diameter of 7 mm were used herein, and the reaction area was specifically defined.

The following five electrolytic solutions were prepared.
Electrolytic solution 5 (FIG. 9 and FIG. 10):

| | |
|---|---|
| AgBr | 500 mmols/L |
| NaI | 750 mmols/L |

Electrolytic solution 6 (FIG. 11 and FIG. 12):

| | |
|---|---|
| AgBr | 500 mmols/L |
| NaI | 750 mmols/L |
| Coumarin | 1 g/L |
| MEMI | 1 g/L |

Electrolytic solution 7 (FIG. 13 and FIG. 14):

| | |
|---|---|
| AgBr | 500 mmols/L |
| NaI | 750 mmols/L |
| Coumarin | 1 g/L |
| MEMI | 1 g/L |
| TEA | 2.5 g/L |

Electrolytic solution 8 (FIG. 15 and FIG. 16):

| | |
|---|---|
| AgBr | 500 mmols/L |
| NaI | 750 mmols/L |
| Coumarin | 1 g/L |
| MEMI | 1 g/L |
| TEA | 5 g/L |

Electrolytic solution 9 (FIG. 17 and FIG. 18):

| | |
|---|---|
| AgBr | 500 mmols/L |
| NaI | 750 mmols/L |
| Coumarin | 1 g/L |
| MEMI | 1 g/L |
| TEA | 10 g/L |

These electrolytic solutions 5 to 9 were subjected to a silver deposition/dissolution cycle test according to a constant-potential method, in which the variation in the transmittance through each solution was measured.

The driving voltage in silver deposition was −1.4 V relative to silver, and the driving time was 1.0 second. Being different from this, the driving voltage in silver dissolution stepwise varied to have a driving voltage profile of +4.5 V for 20 msec→+1.6 V for 2 sec→+3.5 V for 20 msec relative to silver. The variation in the transmittance through each solution is shown in FIG. 9, FIG. 11, FIG. 13, FIG. 15 and FIG. 17 (in silver deposition), and in FIG. 10, FIG. 12, FIG. 14, FIG. 16 and FIG. 18 (in silver dissolution). The transmittance measured is based on the transmittance of the ITO electrode.

Figure 17:
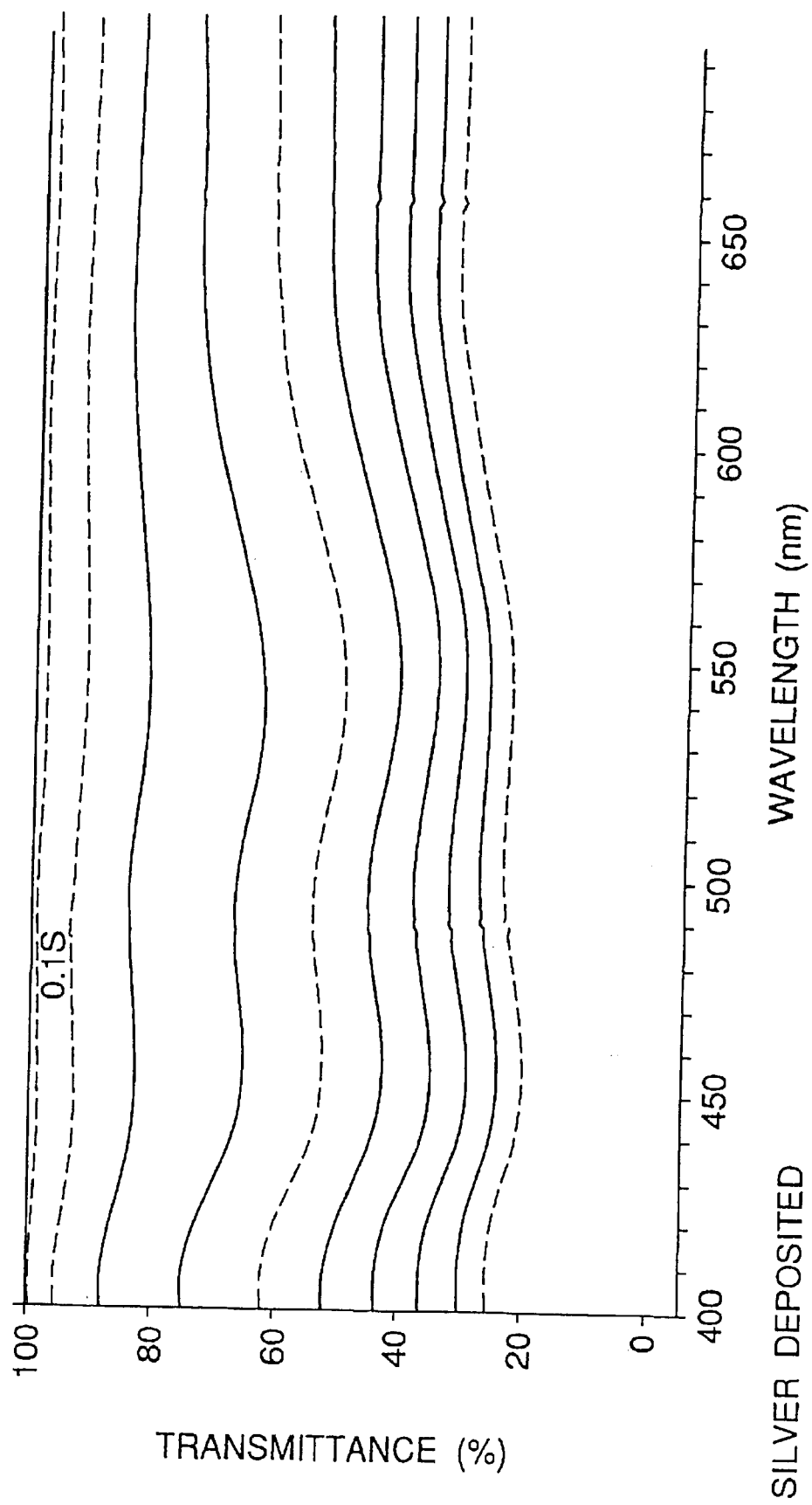
FIG. 17 is a spectral pattern indicating the variation in the transmittance, relative to the voltage applied, of an optical device of the invention, which is in color expression condition.
Figure 18:
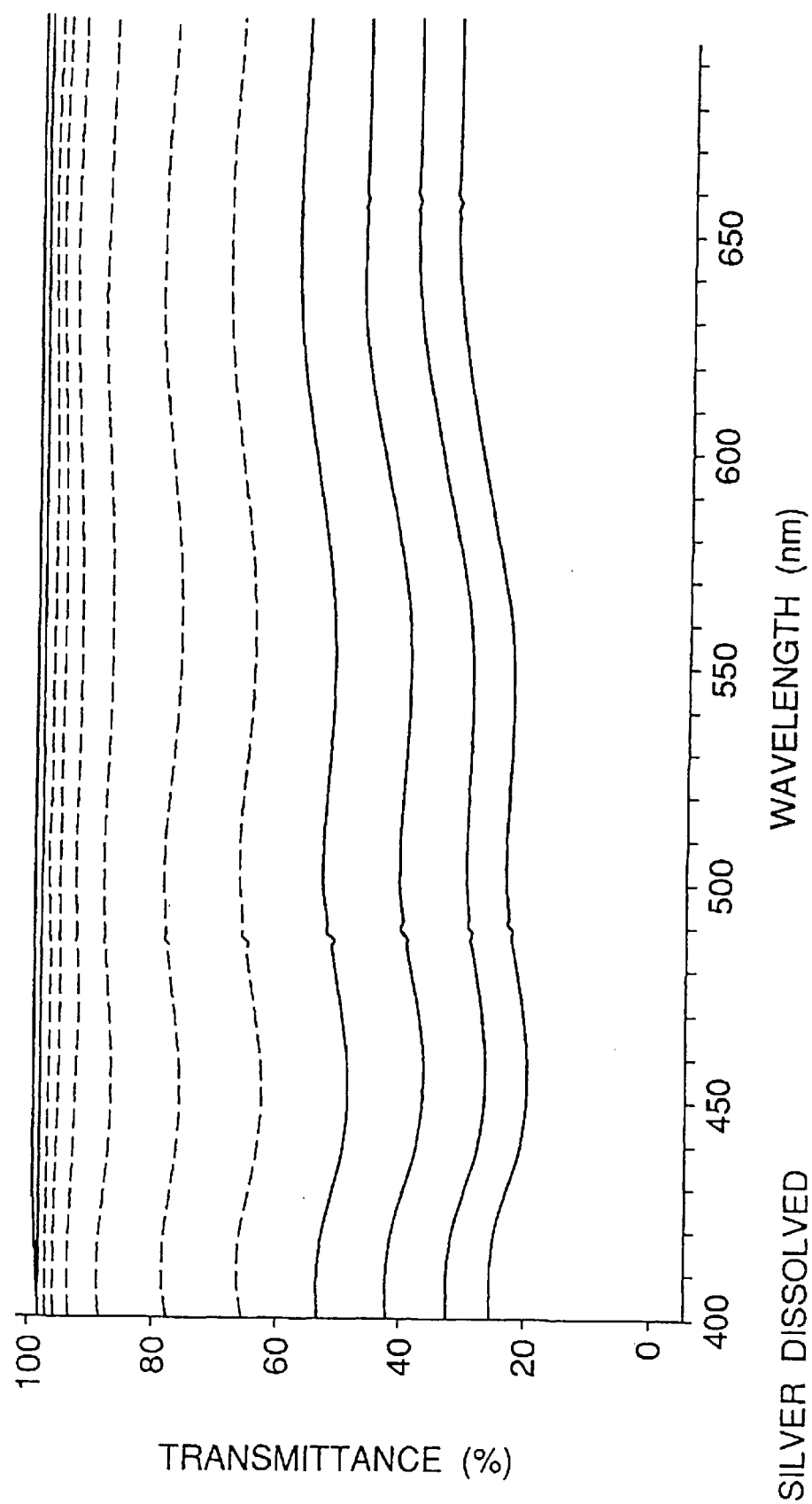
FIG. 18 is a spectral pattern indicating the variation in the transmittance, relative to the voltage applied, of the optical device for FIG. 17, which is in color extinction condition.

From the data illustrated, it is known that the electrolytic solution 9 of the invention brings about satisfactory light modulation (to induce transmittance variation), as in FIG. 17 and FIG. 18. It is further known that the spectral characteristic of the silver film as deposited from this system is characterized by the uniform absorbance within a visible ray range, and that the transmittance through the solution varies in the same manner both in silver deposition and in silver dissolution. This means that the solution has a light-shielding function within a visible ray range.

The light-modulating function of the electrolytic solution 9 does not so much differ from that of the other electrolytic solutions 5 to 8. However, even though the solution 9 contains a large amount of TEA of 10 g/L, it exhibits good light modulation. As so mentioned hereinabove, the solution 9 containing TEA has the ability to prevent it from being discolored in practical use, and is therefore advantageous.

EXAMPLE 3

Effect of Reduction 500 mmols/L of silver bromide and 750 mmols/L of sodium iodide were dissolved in a mixed solvent of dimethyl sulfoxide (DMSO) and acetonitrile (AN) (55/45) to prepare an electrolytic solution. Using this electrolytic solution, transparent electrodes (ITO electrodes were used herein) were applied with an oxidation current at a current density of 18 mA/cm$^2$, thereby yellowing the vicinity of each of the electrodes. Then, the effect of the addition of additives was measured in terms of transparentization.

The additives which were used herein were mono-ethanolamine (MEA), diethanolamine (DEA) and triethanolamine (TEA). As comparison with a system where no additive was added, the amount of each of the additives was fixed to be 2.5 g/L and 5.0 g/L, respectively. After applying an oxidation current for an arbitrary period of time, the speed of the transparentization after the application was measured at a wavelength of 400 nm. The results are shown in FIG. 19.

Figure 19:
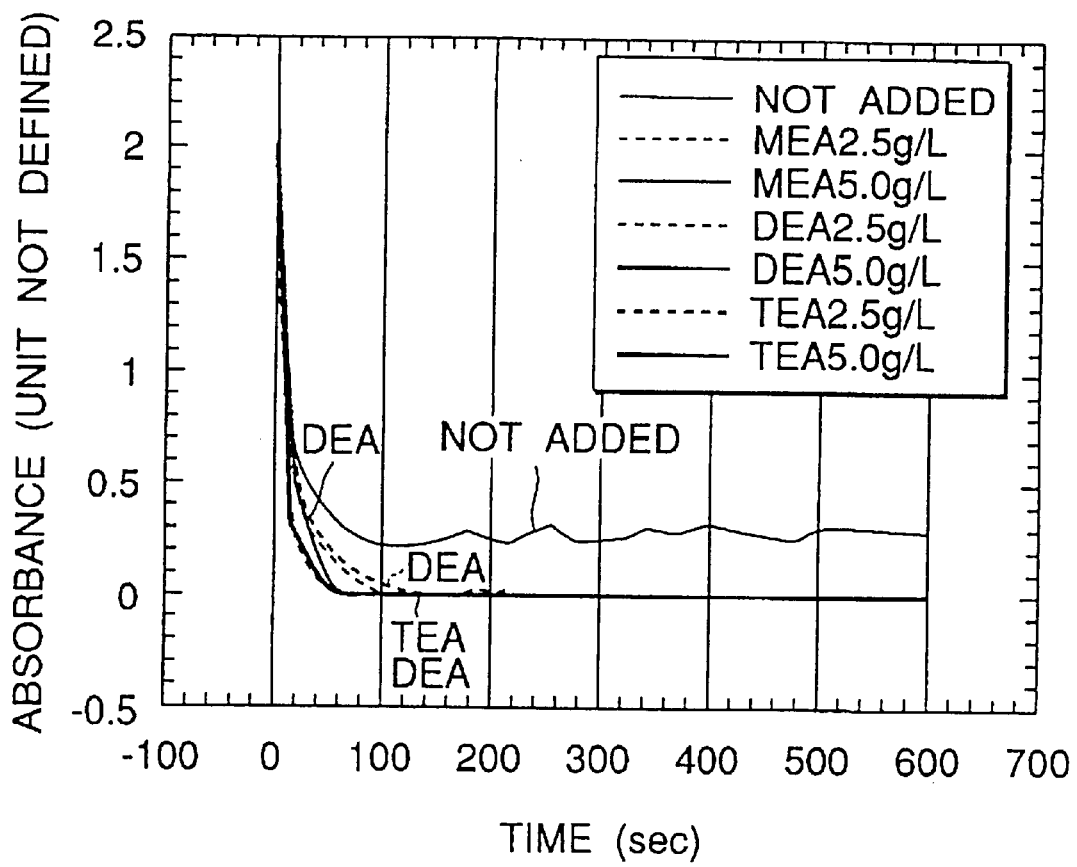
FIG. 19 is a graph indicating the effect of addition of an alkanolamine to an electrolytic solution of an optical device.

It is understood from the results shown in FIG. 19 that though in case where no additive was added, the yellowed state did not disappear, in case where MED, DEA or TEA was added, all of these additives had an ability of reducing peroxidized products and hence, they are useful for the transparentization.

EXAMPLE 4

Figure 20:
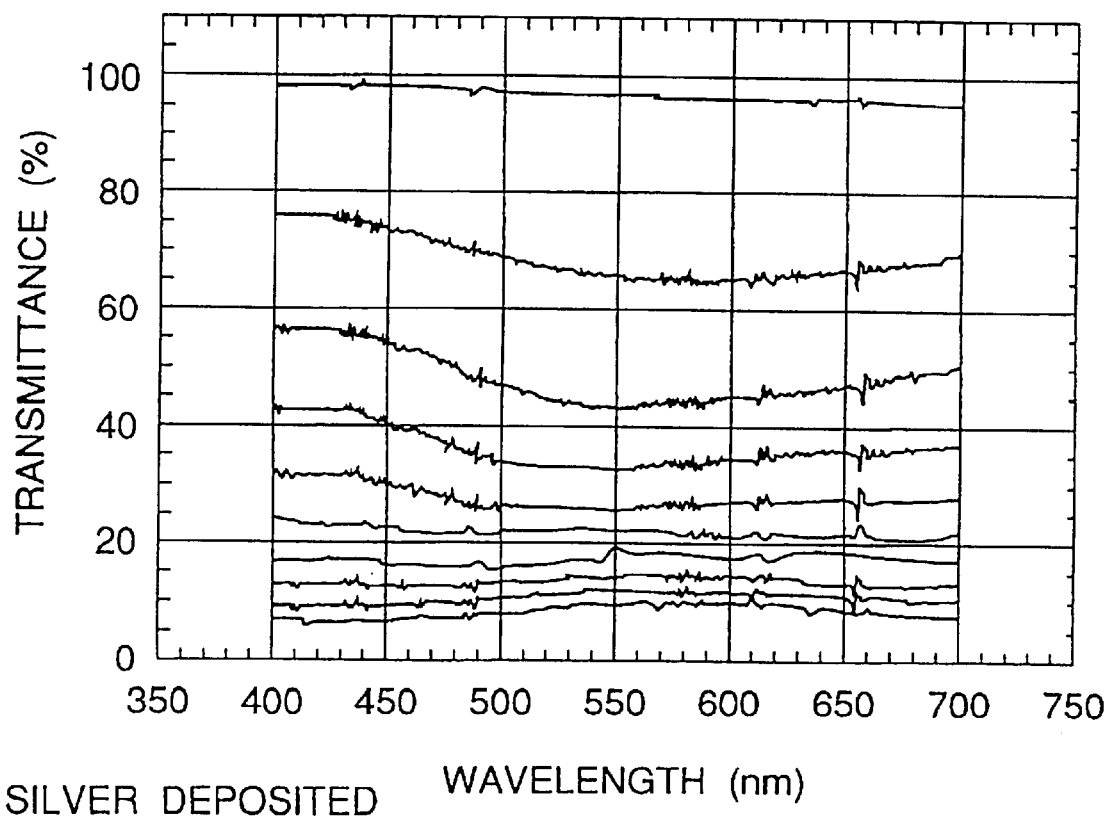
FIG. 20 is a graph indicating the variation in the transmittance, relative to the voltage applied of an optical device at the time of coloration.
Figure 21:
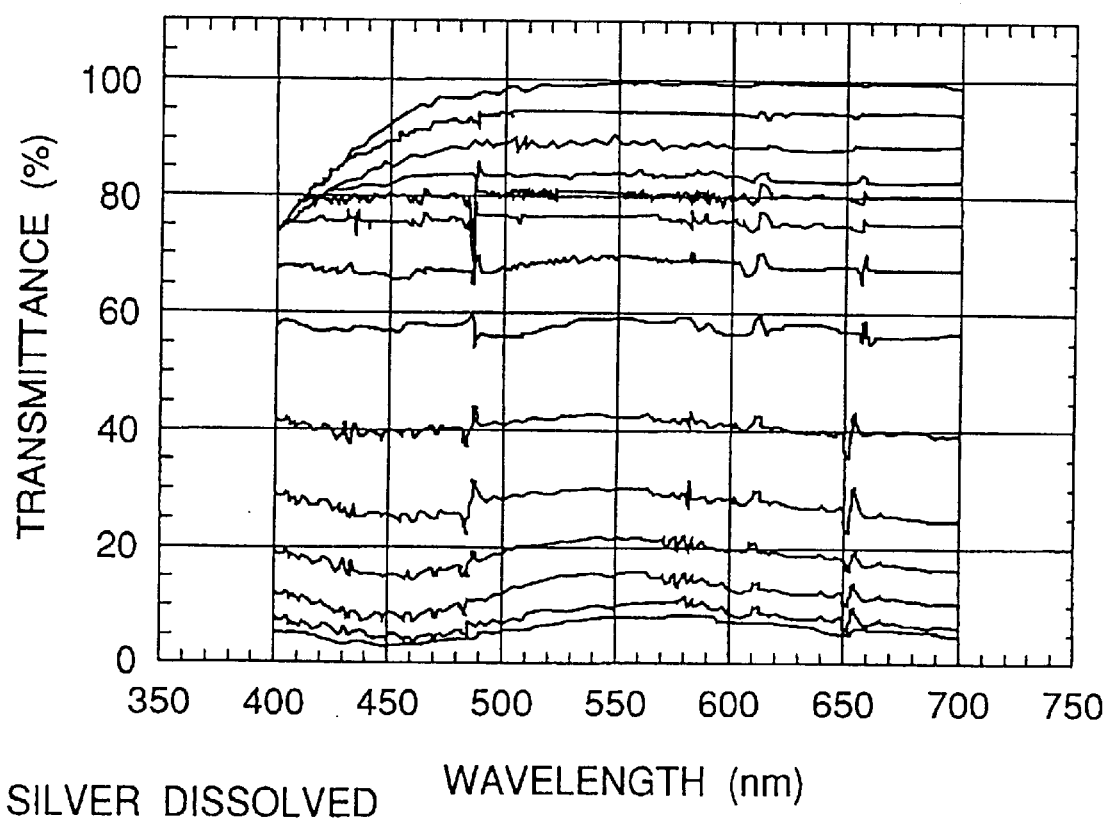
FIG. 21 is a graph indicating the variation in the transmittance, relative to the voltage applied of the optical device for FIG. 20 at the time of discoloration.

Driving Characteristics (1) Monoethanolamine 500 mmols/L of silver bromide and 750 mmols/L of sodium iodide were dissolved in a mixed solvent of dimethyl sulfoxide (DMSO) and acetonitrile (AN) (55/45) to prepare an electrolytic solution. To this electrolytic solution was added 5.0 g/L of monoethanolamine, and a reduction current was applied at a current density of 18 mA/cm$^2$ for 2 seconds, thereby depositing silver. Also, an oxidation current was applied for 2 seconds, thereby dissolving the silver. Then, any change in the spectral characteristics is shown in FIG. 20 (silver deposited) and FIG. 21 (silver dissolved), respectively. The measurement of the transmittance was carried out in an interval of 0.2 second at 22° C. In the deposition side, when the transmittance of ITO electrodes was taken as 100%, the transmittance decreased with a lapse of time, whereas in the dissolution side, the transmittance increased (hereafter the same).

Figure 22:
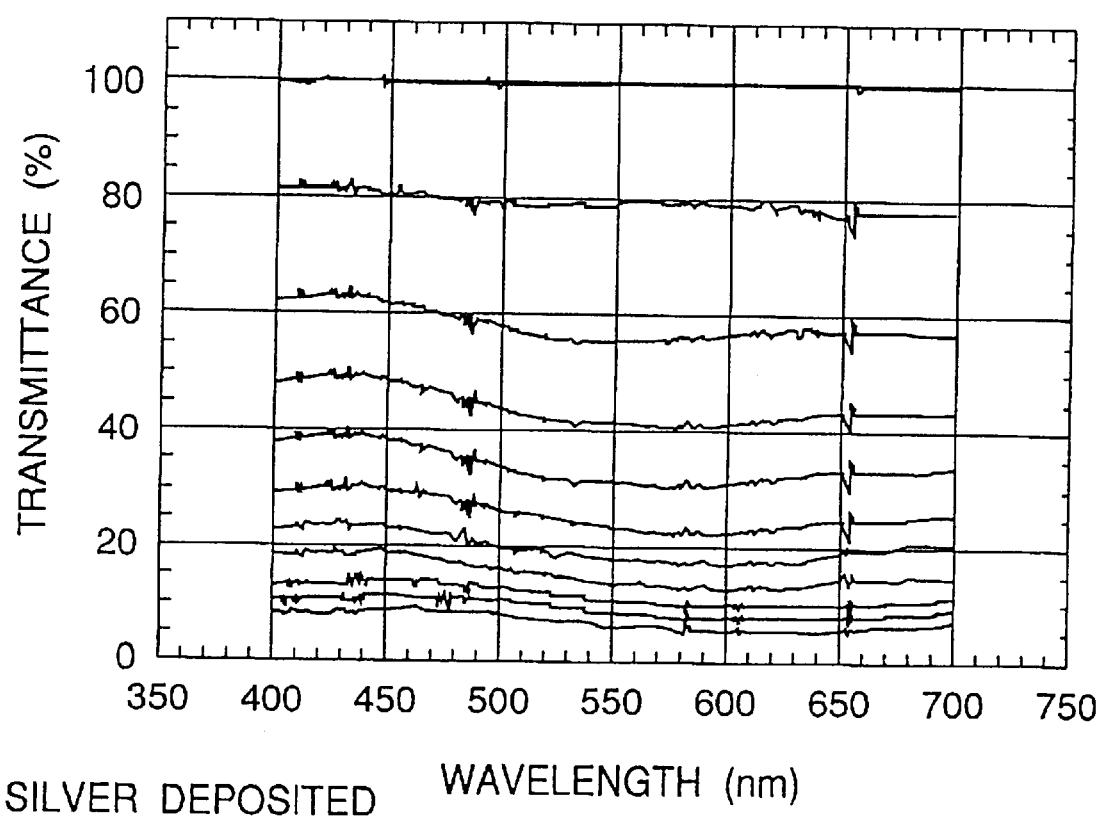
FIG. 22 is a graph indicating the variation in the transmittance, relative to the voltage applied of another optical device at the time of coloration.
Figure 23:
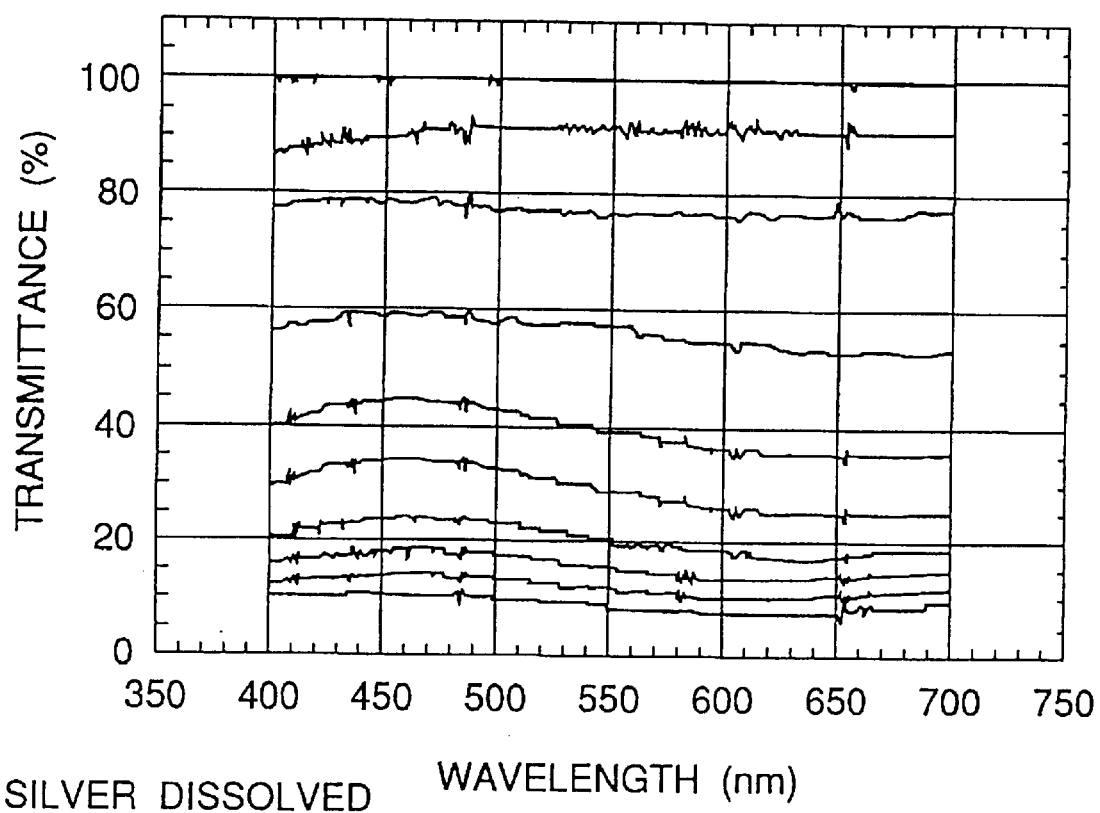
FIG. 23 is a graph indicating the variation in the transmittance, relative to the voltage applied of the optical device for FIG. 22 at the time of discoloration.

(2) Diethanolamine 500 mmols/L of silver bromide and 750 mmols/L of sodium iodide were dissolved in a mixed solvent of dimethyl sulfoxide (DMSO) and acetonitrile (AN) (55/45) to prepare an electrolytic solution. To this electrolytic solution was added 5.0 g/L of diethanolamine, and a reduction current was applied at a current density of 18 mA/cm$^2$ for 2 seconds, thereby depositing silver. Also, an oxidation current was applied for 2 seconds, thereby dissolving the silver. Then, any change in the spectral characteristics is shown in FIG. 22 (silver deposited) and FIG. 23 (silver dissolved) respectively.

Figure 24:
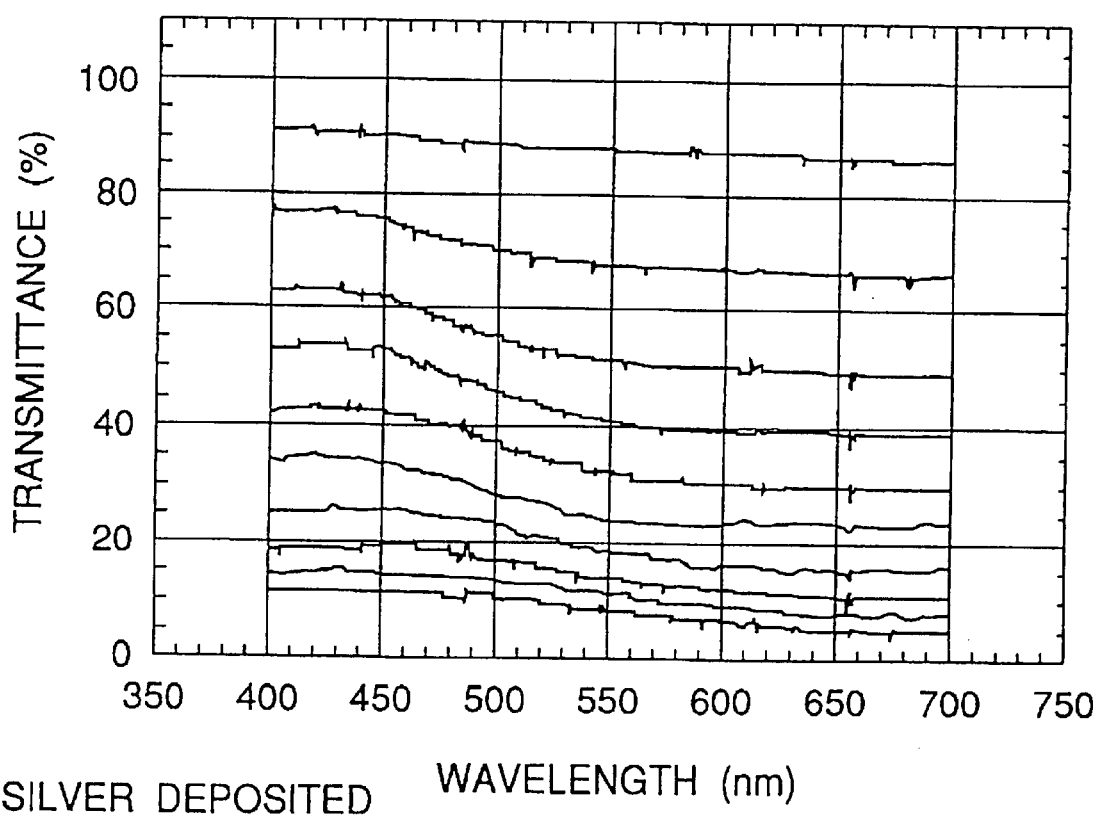
FIG. 24 is a graph indicating the variation in the transmittance, relative to the voltage applied of still another optical device at the time of coloration.
Figure 25:
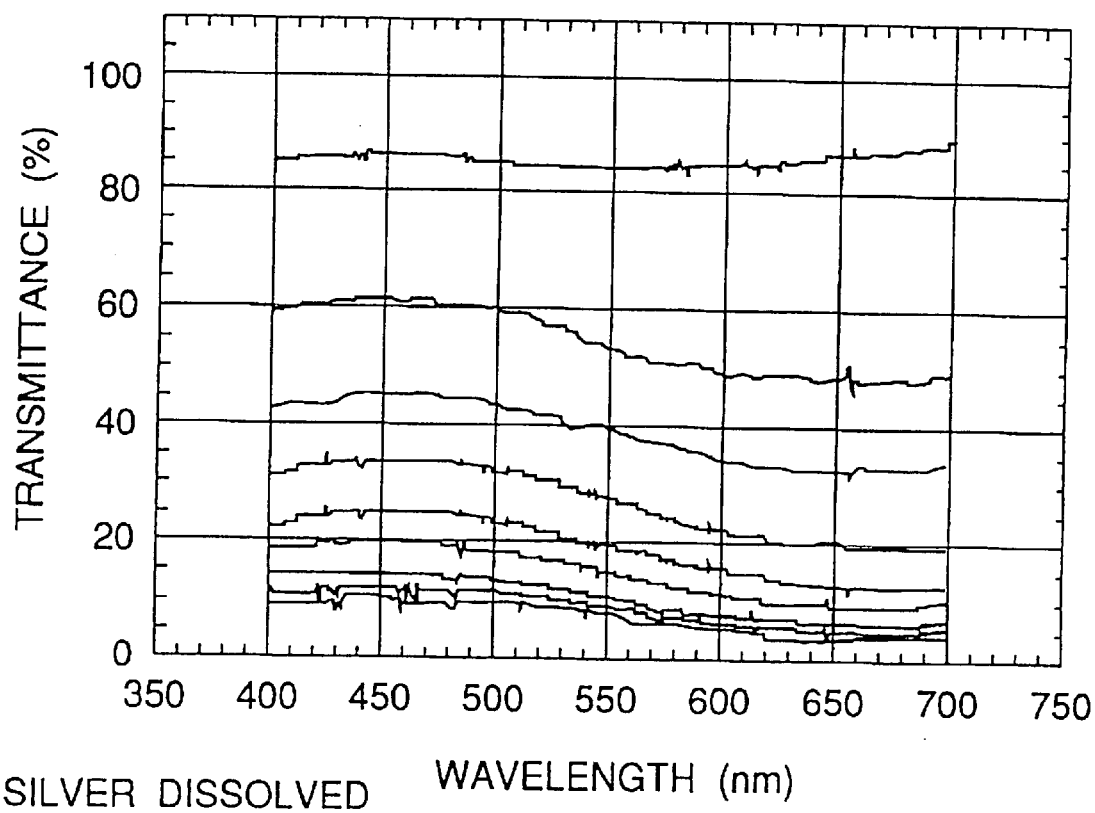
FIG. 25 is a graph indicating the variation in the transmittance, relative to the voltage applied of the optical device for FIG. 24 at the time of discoloration.

(3) Triethanolamine 500 mmols/L of silver bromide and 750 mmols/L of sodium iodide were dissolved in a mixed solvent of dimethyl sulfoxide (DMSO) and acetonitrile (AN) (55/45) to prepare an electrolytic solution. To this electrolytic solution was added 5.0 g/L of triethanolamine, and a reduction current was applied at a current density of 18 mA/cm$^2$ for 2 seconds, thereby depositing silver. Also, an oxidation current was applied for 2 seconds, thereby dissolving the silver. Then, any change in the spectral characteristics is shown in FIG. 24 (silver deposited) and FIG. 25 (silver dissolved), respectively.

It can be understood from the above results that when an electrolytic solution having an additive added thereto according to this invention is used, the light can be fully modulated (the transmittance can be varied). Also, in this system, the spectral characteristics of the deposited silver film show uniform absorption within a visible light range, and in both of the deposition and dissolution, the transmittance rises and falls similarly. Accordingly, it is evident that the electrolytic solution of this invention has light shieldability.

EXAMPLE 5

Storage Characteristics

The same procedures as in Example 3 were repeated to prepare electrolytic solutions, except that 5 g/L of each of the additives as listed below was dissolved in each of the solvents as also listed below. The thus prepared electrolytic solutions were subjected to a storage test at 60° C. for 30 days, and whether the color of each the solutions after the storage test was deteriorated was evaluated.

Solvents:
DMSO: Dimethyl sulfoxide
DMF: Dimethylformamide
DMAC: Dimethylacetamide
2-EE: 2-Ethoxyethanol
NMP: n-Methylpyrrolidone
GBL: g-Butyrolactone
AN: Acetonitrile
PC: Propylene carbonate Additives (Ethanolamine derivatives):
MEA: Monoethanolamine
DEA: Diethanolamine
TEA: Triethanolamine The degree of deterioration in the color expression was evaluated on a scale of five grades, in which grade 1 means that the color expression was greatly deteriorated, and 5 means that the color expression was not deteriorated. The results obtained shown in Tables 1 and 2.

TABLE 1

[Pure solvent]
Solvent resistance of additive

| | Degree of deterioration in color expression | | |
|---|---|---|---|
| | MEA | DEA | TEA |
| DMSO | 5 | 3 | 1 |
| DMF | 4 | 4 | 3 |
| DMAC | 5 | 4 | 4 |
| 2-EE | 2 | 2 | 1 |
| NMP | 3 | 3 | 2 |
| GBL | 1 | 3 | 5 |
| AN | 5 | 5 | 5 |
| PC | 5 | 5 | 5 |

TABLE 2

[Mixed solvent of DMSO with other solvent (50/50 by volume)]
Solvent resistance of additive

| | Degree of deterioration in color expression | | |
|---|---|---|---|
| | MEA | DEA | TEA |
| DMSO | — | — | — |
| DMF | 4 | 4 | 3 |
| DMAC | 4 | 4 | 4 |
| 2-EE | 2 | 2 | 1 |
| NMP | 3 | 3 | 2 |
| GBL | 1 | 3 | 4 |
| AN | 4 | 4 | 4 |
| PC | 4 | 4 | 4 |

As a result, it has become clear that with respect to the storage characteristics against a pure solvent, as shown in Table 1, since in solvents such as PC or acetonitrile, the state in which the additive is sparingly soluble therein is preferential, a circumstance where the color expression is hardly deteriorated is generated in such a system. Incidentally, a dissociation constant (pKa) of triethanolamine in each of the solvents is 7.5 in DMSO, 7.6 in DMAC, 15.9 in AN and 15.9 in PC, respectively (see Izutsu, Hisuiyobai No Denkikagaku ("Electrochemistry of Non-aqueous Solvents")).

In addition, as shown in Table 2, with respect to the mixed solvent based on DMSO, though the results are substantially identical with those in the pure solvent, if the degree of deterioration in color is about 4 to 5, there is no problem in practical use as a device.

Examples of the invention mentioned hereinabove can be modified and changed on the basis of the technical idea of the invention.

For example, the type of the RED material and the components constituting RED, especially the type and the concentration of the supporting salt of an alkali metal halide may be varied.

The structure comprising the ITO electrode pattern, as well as the materials for various parts constituting the cell, and even the driving method are not limited to those illustrated above. For example, the electrode pattern of FIG. 17 may be varied to a linear stripe-like or cross stripe-like one; and the plural electrode portions may be in different parallel cells each filled with a different RED solution, for which, if desired, the RED solutions may be combined with any conventional EC solutions.

The materials for the optical device of the invention may be combined with any other known filter materials (for example, organic electrochromic materials, liquid crystals, electroluminescent materials). The optical device of the invention has many applications, for example, as optical stops in CCD and for light modulation in various optical systems, electrophotographic duplicators and optical communication instruments.

As has been mentioned hereinabove, the technical idea on which the present invention is based is quite different from that for conventional EC materials. Specifically, the invention is characterized in that a supporting salt such as LiX or the like, an alkanolamine and optionally mercaptomethylimidazole are added to an RED solution containing a silver halide to give a reversible system to be put between a working electrode and a counter electrode that face each other. In the invention, driving control of those electrodes (especially for the voltage to be applied thereto) brings about silver deposition and dissolution on and from the electrodes from the reversible system. Accordingly, using the RED material, the present invention provides a power-saving, non-light-emitting optical device capable of being driven within a visible ray range. In addition, since the electrodes constituting the device are prevented from being in overpotential condition, the prolongation of the device is realized and the reversibility of the electrolytic solution in the device is enhanced. As the case may be, the electrolytic solution to be in the device is protected from being discolored and deteriorated while stored at high temperatures.

What is claimed is:

1. An optical device, comprising:
    a working electrode;
    a counter electrode; and
    a silver salt solution between said working electrode and said counter electrode, said silver salt solution including at least one supporting salt selected from the group consisting of LiX, NaX and KX, wherein X represents an atom selected from the group consisting of a fluorine atom, a chlorine atom, a bromine atom and an iodine atom for dissolving the silver salt in said solution under driving control of the working and counter electrodes; and
    an alkanolamine in said solution.

2. The optical device as claimed in claim 1, wherein the alkanolamine is at least one member selected from the group consisting of triethanolamine, diethanolamine and monoethanolamine.

3. The optical device as claimed in claim 1, wherein the concentration of the alkanolamine in said solution is larger than 2.5 g/L.

4. The optical device as claimed in claim 1, wherein the concentration of the alkanolamine in said solution is not smaller than 5 g/L.

5. The optical device as claimed in claim 1, wherein the concentration of the alkanolamine in said solution is not smaller than 5 g/L and a mercaptoalkylimidazole is further added to said solution.

6. The optical device as claimed in claim 1, wherein in order to dissolve a silver halide as said silver salt, said supporting salt capable of supplying a halogen that is the same as or different from the halogen of said silver halide is added.

7. The optical device as claimed in claim 1, wherein said supporting salt is added to said solution in an amount of from ½ to 5 times the concentration of a silver halide as said silver salt.

8. The optical device as claimed in claim 1, wherein an electrolytic solution of a silver halide as said silver salt as dissolved in a solvent is so filled between said working electrode and said counter electrode, at least one of which is the electrode for deposition and dissolution of silver, that it is kept in contact with these electrodes.

9. The optical device as claimed in claim 1, wherein said solution of a silver halide as said silver salt as dissolved in water or in a non-aqueous solvent is so put as to cause color expression or extinction through deposition or dissolution of silver therein.

10. The optical device as claimed in claim 1, wherein said solution has a concentration of a silver halide as said silver salt of from 0.03 to 2.0 mols/L.

11. The optical device as claimed in claim 9, wherein said non-aqueous solvent is at least one selected from the group consisting of dimethylformamide, diethylformamide, N,N-dimethylacetamide, N-methylpropionic acid amide, N-methylpyrrolidone, propylene carbonate, acetonitrile, 2-ethoxyethanol, 2-methoxyethanol, dimethylsulfoxide, dioxolane, ethyl acetate, tetrahydrofuran, methyltetrahydrofuran, dimethoxyethane and γ-butyrolactone.

12. The optical device as claimed in claim 1, wherein said working electrode for deposition or dissolution of silver is a transparent electrode of an indium tin oxide.

13. The optical device as claimed in claim 12, wherein said transparent electrode is chemically or physically modified.

14. An electrolytic solution to be put between a working electrode and counter electrode, said solution comprising:
   a silver salt effective to cause deposition or dissolution of silver under driving control of these electrodes;
   as least one supporting salt selected from the group consisting of LiX, NaX and KX, wherein X represents an atom selected from the group consisting of a fluorine atom, a chlorine atom, a bromine atom and an iodine atom for dissolving the silver salt in the solution; and
   an alkanolamine.

15. The electrolytic solution as claimed in claim 14, wherein the alkanolamine is at least one member selected from the group consisting of triethanolamine, diethanolamine and monoethanolamine.

16. The electrolytic solution as claimed in claim 14, wherein the concentration of the alkanolamine is larger than 2.5 g/L.

17. The electrolytic solution as claimed in claim 14, wherein the concentration of the alkanolamine is not smaller than 5 g/L.

18. The electrolytic solution as claimed in claim 14, in which the concentration of the alkanolamine is not smaller than 5 g/L and which further contains a mercaptoalkylimidazole.

19. The electrolytic solution as claimed in claim 14, wherein in order to dissolve a silver halide as said silver salt, said supporting salt capable of supplying a halogen that is the same as or different from the halogen of said silver halide is added.

20. The electrolytic solution as claimed in claim 14, wherein said supporting salt is in an amount of from ½ to 5 times the concentration of a silver halide as said silver salt.

21. The electrolytic solution as claimed in claim 14, in which a silver halide as said silver salt is dissolved in a solvent and which is so filled between said working electrode and counter electrode, at least one of which is the electrode for deposition and dissolution of silver, that it is kept in contact with these electrodes.

22. The electrolytic solution as claimed in claim 14, wherein a silver halide as said silver salt is dissolved in water or in a non-aqueous solvent to cause color expression or extinction through deposition or dissolution of silver therein.

23. The electrolytic solution as claimed in claim 14, which has a concentration of a silver halide as said silver salt of from 0.03 to 2.0 mols/L.

24. The electrolytic solution as claimed in claim 22, wherein said non-aqueous solvent is at least one selected from the group consisting of dimethylformamide, diethylformamide, N,N-dimethylacetamide, N-methylpropionic acid amide, N-methylpyrrolidone, propylene carbonate, acetonitrile, 2-ethoxyethanol, 2-methoxyethanol, dimethylsulfoxide, dioxolane, ethyl acetate, tetrahydrofuran, methyltetrahydrofuran, dimethoxyethane and γ-butyrolactone.

25. The electrolytic solution as claimed in claim 14, for which said working electrode for deposition or dissolution of silver is a transparent electrode of an indium-tin oxide.

26. The electrolytic solution as claimed in claim 25, for which said transparent electrode is chemically or physically modified.

* * * * *